United States Patent
Maeda

(10) Patent No.: US 9,272,561 B2
(45) Date of Patent: Mar. 1, 2016

(54) PRINTING SYSTEM FOR INHIBITING Z-FOLDING AND CONTROL METHOD THEREOF

(71) Applicant: CANON KABUSHIKI KAISHA, Tokyo (JP)

(72) Inventor: Yuuki Maeda, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 76 days.

(21) Appl. No.: 13/926,007

(22) Filed: Jun. 25, 2013

(65) Prior Publication Data
US 2013/0287525 A1 Oct. 31, 2013

Related U.S. Application Data

(63) Continuation of application No. 12/538,461, filed on Aug. 10, 2009, now Pat. No. 9,019,556.

(30) Foreign Application Priority Data
Aug. 11, 2008 (JP) .................. 2008-207405

(51) Int. Cl.
*B65H 37/06* (2006.01)
*B42B 2/00* (2006.01)
(Continued)

(52) U.S. Cl.
CPC *B42B 2/00* (2013.01); *B65H 45/00* (2013.01); *H04N 1/0048* (2013.01); *H04N 1/00204* (2013.01); *H04N 1/00244* (2013.01); *H04N 1/00347* (2013.01); *H04N 1/00413* (2013.01); *H04N 1/00416* (2013.01); *H04N 1/00432* (2013.01); *H04N 1/00474* (2013.01); *H04N 1/00482* (2013.01); *H04N 1/00567* (2013.01);
(Continued)

(58) Field of Classification Search
CPC .............................. B65H 37/04; B65H 37/06
USPC ........... 270/32, 37, 45, 58.08, 58.09; 399/410
See application file for complete search history.

(56) References Cited

U.S. PATENT DOCUMENTS 5,905,935 A * 5/1999 Wakamatsu et al. .......... 399/407
7,762,168 B2 7/2010 Van Den Tillaart
(Continued)

FOREIGN PATENT DOCUMENTS

JP 2000-222157 A 8/2000
JP 2003146532 A 5/2003
(Continued)

OTHER PUBLICATIONS

Japanese Office Action for JP 2008-207405. Mail date Jan. 8, 2013. Cited in parent U.S. Appl. No. 12/538,461.
(Continued)

*Primary Examiner* — Patrick Mackey
(74) *Attorney, Agent, or Firm* — Rossi, Kimms & McDowell LLP

(57) ABSTRACT

A printing system for controlling to allow various settings by one job and reducing output of unnecessary printed materials is provided. To accomplish this, the present invention sets a post-process to be executed for a plurality of sheets that are printed by execution of a job as a first setting, sets a post-process to be executed for part of the sheets included in the plurality of sheets as a second setting, and causes a post-processing unit to execute post-processes according to the setting of the post-processes set as the first setting and the second setting.

6 Claims, 22 Drawing Sheets

(51) Int. Cl.
*H04N 1/00* (2006.01)
*B65H 45/00* (2006.01)

(52) U.S. Cl.
CPC .... *H04N 1/00639* (2013.01); *H04N 2201/0039* (2013.01)

(56) References Cited

U.S. PATENT DOCUMENTS

| | | | |
|---|---|---|---|
| 8,505,898 B2* | 8/2013 | McIntyre | 270/37 |
| 2003/0227121 A1* | 12/2003 | Yamakawa et al. | 270/37 |
| 2004/0046304 A1* | 3/2004 | Itou et al. | 270/32 |
| 2005/0232656 A1 | 10/2005 | Asai et al. | |
| 2005/0271400 A1* | 12/2005 | Okamoto et al. | 399/21 |
| 2005/0281572 A1* | 12/2005 | Kawakami et al. | 399/49 |
| 2006/0038336 A1* | 2/2006 | Hirata et al. | 270/37 |
| 2007/0046971 A1 | 3/2007 | Yokobori et al. | |
| 2007/0060459 A1 | 3/2007 | Hayashi | |
| 2007/0201071 A1 | 8/2007 | Yamada et al. | |
| 2007/0279646 A1 | 12/2007 | Sugimoto et al. | |
| 2008/0043286 A1 | 2/2008 | Yoshida et al. | |
| 2008/0175616 A1 | 7/2008 | Nishida | |
| 2009/0252545 A1* | 10/2009 | Sasaki | 399/410 |
| 2010/0033744 A1 | 2/2010 | Maeda | |

FOREIGN PATENT DOCUMENTS

| | | |
|---|---|---|
| JP | 2005-115683 A | 4/2005 |
| JP | 2006-154416 A | 6/2006 |
| JP | 2007-062269 A | 3/2007 |
| JP | 2009263134 A | 11/2009 |

OTHER PUBLICATIONS

Japanese Office Action cited in Japanese counterpart application No. JP2008-207405, dated Oct. 25, 2013.

Japanese Office Action issued in JP2014-012749 mailed Oct. 31, 2014.

* cited by examiner

F I G. 13

| ENTIRE | INDIVIDUAL | | | | | |
|---|---|---|---|---|---|---|
| | STAPLE | PUNCHING PROCESS | Z-FOLDING | SHEET CUTTING PROCESS | CASE BINDING | SADDLE STITCHING |
| STAPLE | | × | ○ | ○ | × | × |
| PUNCHING PROCESS | ○ | | ○ | ○ | ○ | ○ |
| Z-FOLDING | × | × | | × | × | × |
| SHEET CUTTING PROCESS | ○ | × | ○ | | ○ | ○ |
| CASE BINDING | × | × | × | × | | × |
| SADDLE STITCHING | × | × | × | × | × | |

F I G. 14

| ENTIRE | INDIVIDUAL | | | | | |
| --- | --- | --- | --- | --- | --- | --- |
| | STAPLE | PUNCHING PROCESS | Z-FOLDING | SHEET CUTTING PROCESS | CASE BINDING | SADDLE STITCHING |
| STAPLE | | ○ | × | ○ | × | × |
| PUNCHING PROCESS | ○ | | × | ○ | ○ | ○ |
| Z-FOLDING | × | × | | × | × | × |
| SHEET CUTTING PROCESS | ○ | ○ | × | | ○ | ○ |
| CASE BINDING | × | ○ | × | ○ | | × |
| SADDLE STITCHING | × | ○ | × | ○ | × | |

1310

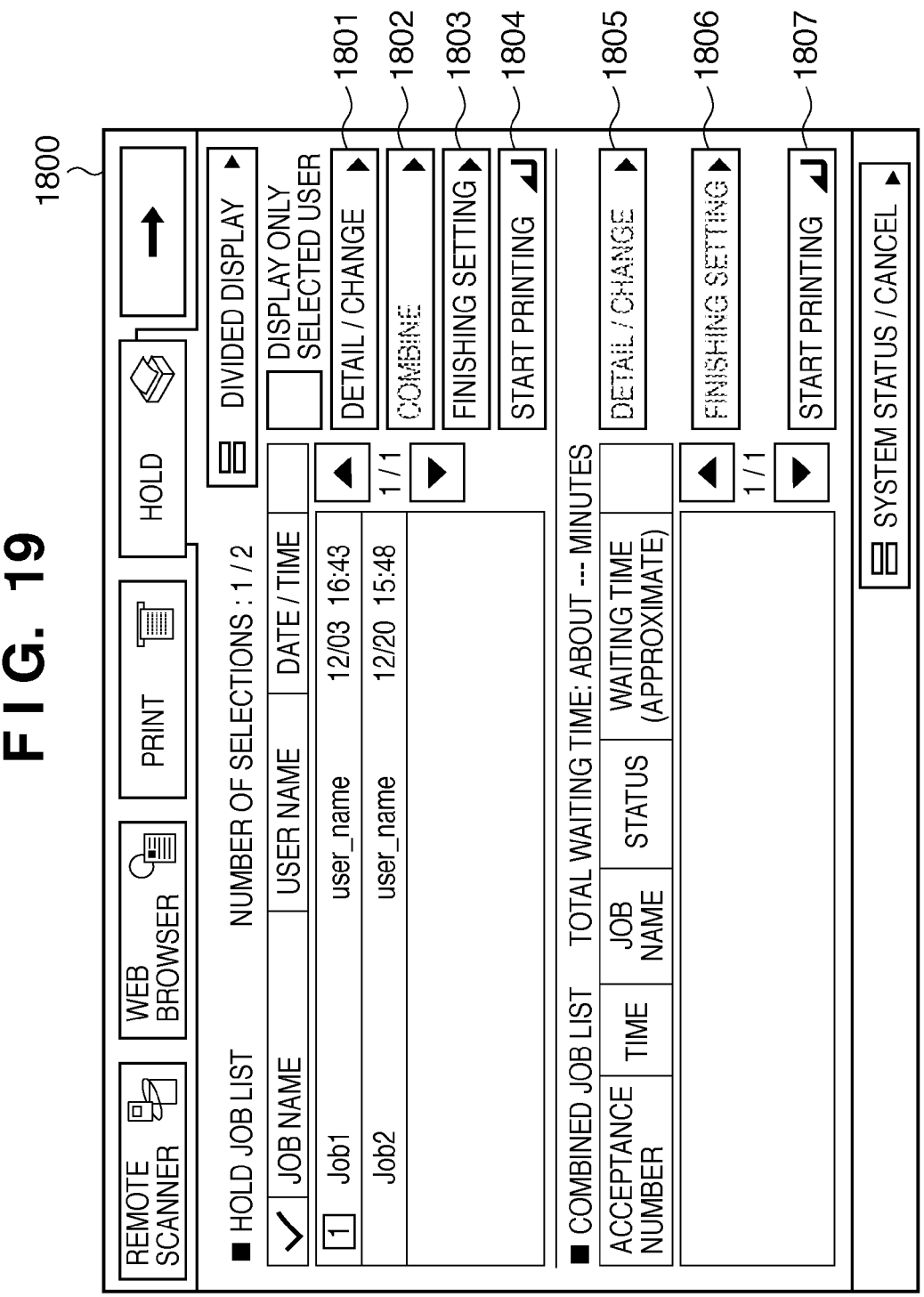

PRINTING SYSTEM FOR INHIBITING Z-FOLDING AND CONTROL METHOD THEREOF

BACKGROUND OF THE INVENTION

1. Field of the Invention

The present invention relates to a printing system and a control method of the printing system for controlling to effectively select a plurality of post-process settings.

2. Description of the Related Art

Flexible selection of formats of various output materials and reduction in human operations while maintaining high productivity are required in a printing system represented by the POD (Print On Demand) market. Examples of possible needs include applying a specific post-process to only part of one print job, applying a post-process to the entire print job and further applying another post-process to part of the print job, and applying a plurality of post-processes to only part of a print job. However, such needs have not been met conventionally. In particular, a combination of a post-process to the entire print job and a post-process to only part of the print job is not thoroughly examined although the combination may be different from the normal control of a post-process for the entire print job.

Other problems may occur when such needs are treated. However, the other problems have not been treated conventionally.

Japanese Patent Laid-Open No. 2000-222157 proposes a technique of combining batches of jobs with different settings, the technique allowing various settings for one print job without outputting unnecessary printed materials. According to the technique, after batches of jobs are combined if there are any settings that may pose a problem due to differences in settings, the same settings are carried over to the combined group. If a collective process is not possible, an alert is issued to prompt the user for a change.

However, the conventional technique includes the following problem. For example, in relation to the settings that may pose a problem, the technique described in Japanese Patent Laid-Open No. 2000-222157 can only carry over the settings of combined print jobs within the combined group. Therefore, the conventional technique is short of allowing all various settings within one print job and does not sufficiently satisfy the needs of the user.

SUMMARY OF THE INVENTION

The present invention enables realization of a print system for controlling to allow various settings in one job and reducing the output of unnecessary printed materials.

One aspect of the present invention provides a printing system comprising: a first setting unit that sets a post-process to be executed for a plurality of sheets that are printed by execution of a job; a second setting unit that sets a post-process to be executed for part of the sheets included in the plurality of sheets; and a control unit that causes a post-processing unit to execute post-processes according to the setting of the post-processes set by the first setting unit and the second setting unit.

Another aspect of the present invention provides a control method of a printing system, the control method comprising: setting a post-process to be executed for a plurality of sheets that are printed by execution of a job as a first setting; setting a post-process to be executed for part of the sheets included in the plurality of sheets as a second setting; and causing a post-processing unit to execute post-processes according to the setting of the post-processes set as the first setting and the second setting.

Still another aspect of the present invention provides a computer-readable storage medium storing a computer program for controlling a printing system, the computer program comprising: setting a post-process to be executed for a plurality of sheets that are printed by execution of a job as a first setting; second setting for setting a post-process to be executed for part of the sheets included in the plurality of sheets as a second setting; and causing a post-processing unit to execute post-processes according to the setting of the post-processes set as the first setting and the second setting.

Further features of the present invention will become apparent from the following description of exemplary embodiments (with reference to the attached drawings).

BRIEF DESCRIPTION OF THE DRAWINGS

FIG. 13 is a diagram showing a combination table of finishing setting;

FIG. 14 is a diagram showing a combination table of finishing setting;

FIG. 19 is a diagram showing an example of a hold tab basic screen 1800;

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Printing System

Figure 1:
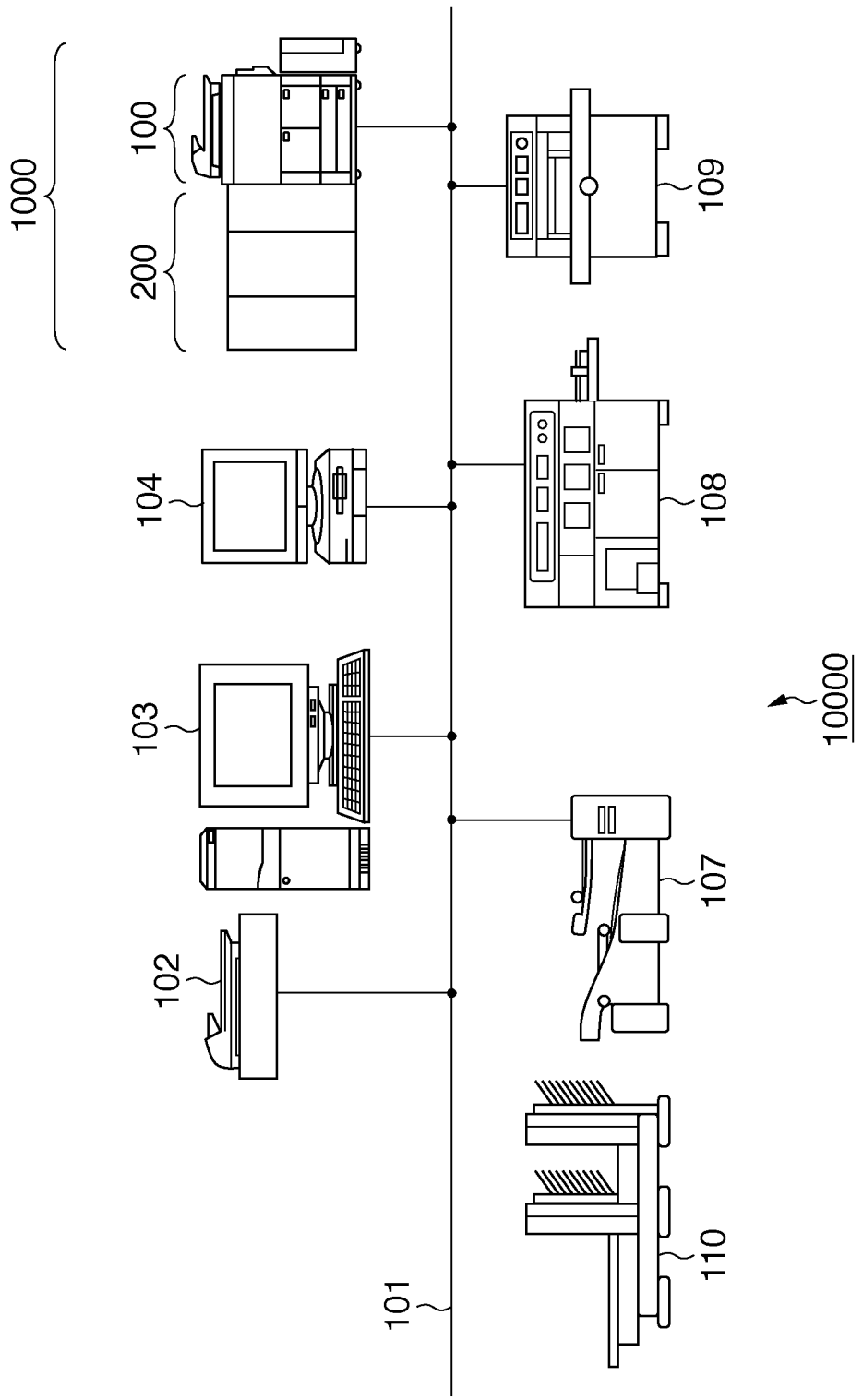
FIG. 1 is a diagram showing a configuration example of a POD system.

A printing system will be described first with reference to FIG. 1. FIG. 1 is a diagram showing a configuration example of a POD system.

A print environment, such as a POD environment, different from an office environment is assumed in a POD system 10000. The POD system 10000 comprises a printing system 1000, a server computer (PC) 103, a client computer (PC) 104, a sheet folding apparatus 107, a sheet cutting device 109, a saddle stitching apparatus 110, a case binding apparatus 108, and a scanner 102. In this way, a plurality of apparatuses constitutes the POD system 10000.

The printing system 1000 comprises a printing apparatus 100 and sheet processing apparatuses 200. A complex machine comprising a plurality of functions, such as a copy function and a PC print function, will be described herein as an example of the printing apparatus 100. However, the printing apparatus may be a single-function type, including only a PC function or a copy function. The complex machine will also be called an MFP (Multi Function Peripheral).

The sheet folding apparatus 107, the sheet cutting device 109, the saddle stitching apparatus 110, and the case binding apparatus 108 are defined as sheet processing apparatuses like the sheet processing apparatuses 200 included in the present printing system 1000. For example, the sheet folding apparatus 107 executes a folding process of job sheets printed by the printing apparatus 100. The sheet cutting device 109 executes a sheet cutting process of sheets printed by the printing apparatus 100 for each batch of sheets constituted by a plurality of sheets (paper). The saddle stitching apparatus 110 executes a saddle stitching process of job sheets printed by the printing apparatus 100. The case binding apparatus 108 executes a case binding process of job sheets printed by the printing apparatus 100. However, in order for the sheet processing apparatuses to execute various sheet processes, the operator needs to take out a printed material of job printed by the printing apparatus 100 from a discharge unit of the printing apparatus 100 and set the printed material on the sheet processing apparatus that will execute the process.

In this way, to use a sheet processing apparatus other than the sheet processing apparatuses 200 included in the printing system 1000, an intervention operation by the operator is needed after the printing process by the printing apparatus 100. Meanwhile, the sheet processing apparatuses 200 included in the printing system 1000 are configured to be able to directly supply the sheets printed by the printing apparatus 100. Specifically, a sheet path inside the printing apparatus 100 is connected to sheet paths inside the sheet processing apparatuses 200. In this way, the sheet processing apparatuses 200 and the printing apparatus 100 included in the printing system 1000 are physically connected to each other. The printing apparatus 100 and the sheet processing apparatuses 200 further include CPUs and are configured to be able to communicate data. In this way, the printing apparatus 100 and the sheet processing apparatuses 200 are electrically connected to each other.

A control unit included in the printing system 1000 comprehensively controls the printing apparatus 100 and the sheet processing apparatuses 200. Specifically, a control unit 205 of the printing apparatus 100 shown in FIG. 2 performs the comprehensive control. The sheet processing apparatuses will also be called post-processing apparatuses or post presses hereinafter.

Among the plurality of apparatuses in the POD system 10000 of FIG. 1, all apparatuses other than the saddle stitching apparatus 110 are connected to the network 101 and are configured to be able to intercommunicate data with other apparatuses. For example, an information processing apparatus as an example of an external apparatus, such as PCs 103 and 104, issues a print execution request through the network 101, and the printing apparatus 100 can print the print data of the job.

The server PC 103 exchanges data with other apparatuses by network communication to manage all jobs to be processed in the POD system 10000. Thus, the server PC 103 functions as a computer that controls and manages the entire series of workflow processes consisted of a plurality of processing procedures. Based on an instruction of job accepted from the operator, the server PC 103 determines post-processing conditions that can be finished in the POD system 10000. The server PC 103 further instructs a post-processing (finishing process) procedure as requested by the end user (customer requested to create a print in this example). In that case, the server PC 103 uses an information exchanging tool such as JDF to exchange information with the post-processing devices by commands or statuses in the post presses.

The sheet processing apparatuses can be included in the POD system 10000 configured this way will be defined by three types of classifications.

[Definition 1]

A sheet processing apparatus satisfying both (Condition 1) and (Condition 2) listed below is defined as an "in-line finisher". An apparatus that meets the definition will also be called an in-line type sheet processing apparatus.

(Condition 1)

A paper path (sheet path) is physically connected to the printing apparatus 100 so that sheets transferred from the printing apparatus 100 can be directly received without intervention by the operator.

(Condition 2)

An electrical connection with another apparatus is formed to allow data communication with another device required to instruct an operation or check the status. Specifically, an electrical connection is formed to allow data communication with the printing apparatus 100, or an electrical connection with an apparatus other than the printing apparatus 100 (such as the server PC 103 and the client PC 104) is formed through the network 101 to allow data communication. An apparatus satisfying at least one of the conditions is considered to meet (Condition 2).

Thus, the sheet processing apparatuses 200 included in the present printing system 1000 are "in-line finishers". This is because, as described above, the sheet processing apparatuses 200 are sheet processing apparatuses physically connected to the printing apparatus 100 and electrically connected to the printing apparatus 100.

[Definition 2]

A sheet processing apparatus not satisfying (Condition 1) but satisfying (Condition 2) described in the previous section is defined as a "near-line finisher". An apparatus meeting the definition will also be called a near-line type sheet processing apparatus.

For example, the paper path is not connected to the printing apparatus 100 either, and the operator needs to perform an intervention operation such as transferring the printed material. However, information for instructing the operation or checking the status can be electrically transmitted and received through a communication unit such as the network 101. The sheet processing apparatus meeting such a condition is defined as a "near-line finisher".

Thus, the sheet folding apparatus 107, the sheet cutting device 109, the saddle stitching apparatus 110, and the case binding apparatus 108 of FIG. 1 are "near-line finishers". This is because these sheet processing apparatuses are not physically connected to the printing apparatus 100 and are electrically connected to another apparatus, such as the server PC 103 and the client PC 104, allowing data communication through the network 101.

[Definition 3]

A sheet processing apparatus not satisfying any of (Condition 1) and (Condition 2) described in the previous section is defined as an "off-line finisher". An apparatus meeting the definition will also be called an off-line type sheet processing apparatus.

For example, the paper path is not connected to the printing apparatus 100 either, and the operator needs to perform an intervention operation such as transferring the printed material. Moreover, a communication unit required for instructing the operation or checking the status is not included either, and data communication with another apparatus is not possible. Therefore, the operator needs to transfer the output material, set the output material, manually input an operation, and manually report the status issued by the apparatus. A sheet processing apparatus meeting such a condition is defined as an "off-line finisher".

Thus, the saddle stitching apparatus 110 of FIG. 1 is an "off-line finisher". This is because this sheet processing apparatus is not physically connected to the printing apparatus 100 and is not connected to the network 101 either.

In this way, the POD system 10000 including various sheet processing apparatuses classified into three types is configured to be able to execute various sheet processes.

For example, the POD system 10000 is configured to be able to apply various sheet processes, such as a sheet cutting process, a saddle stitching process, a case binding process, a sheet folding process, a punch pressing process, an enclosing process, and a collating process, to a printing medium of job printed by the printing apparatus 100. In this way, sheet processing can be executed in a binding and printing format desired by the end user (customer).

The server PC 103 manages various other near-line finishers and off-line finishers such as a stapler-dedicated apparatus, a punch pressing-dedicated apparatus, an enclosing apparatus, and a collator. With the near-line finishers and a predetermined protocol, the server PC 103 sequentially performs polling or the like to figure out the device status and the job status through the network 101. The server PC 103 further manages an execution status (progress) of each of a plurality of jobs to be processed in the POD system 10000.

<Control Configuration of Printing System>

Figure 2:
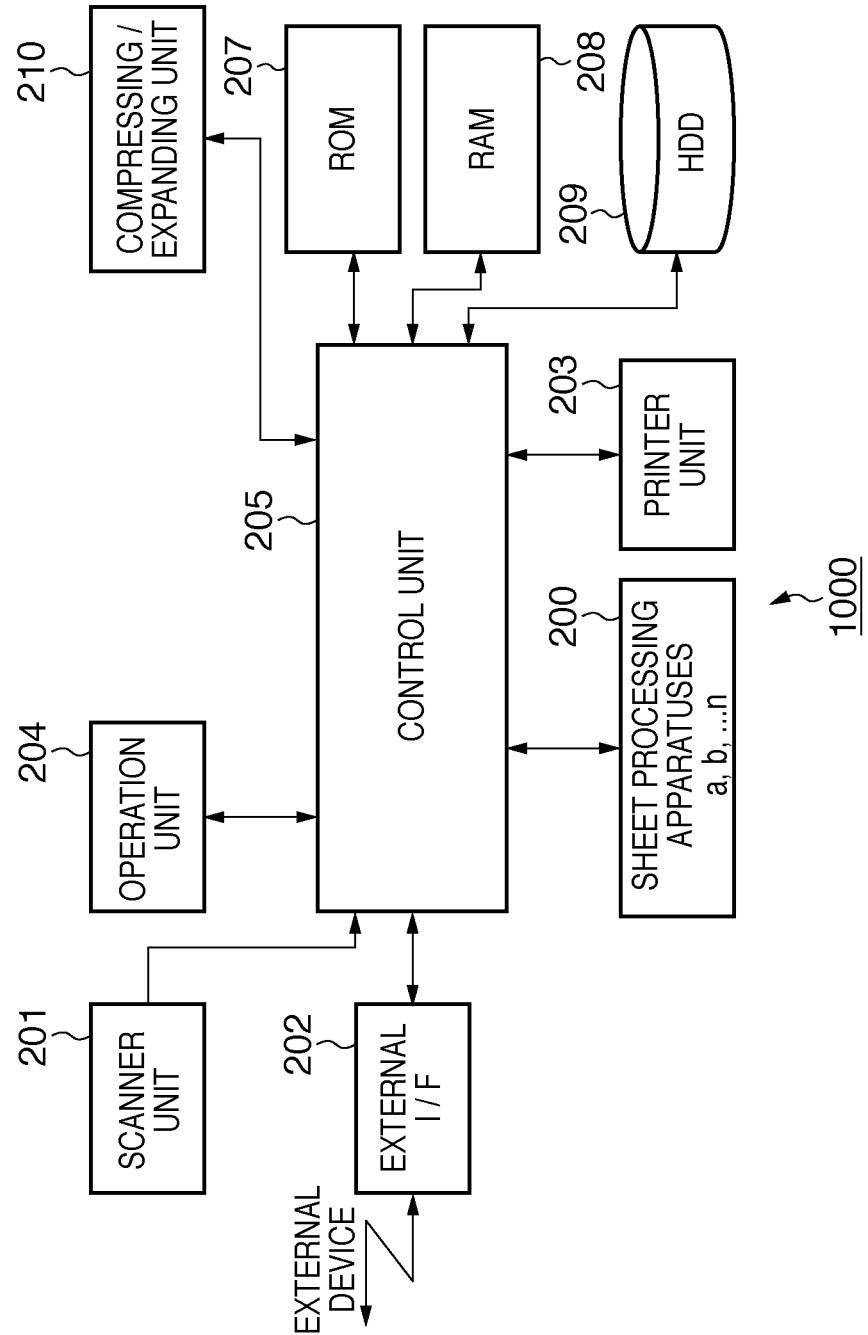
FIG. 2 is a diagram showing an example of a control configuration of a printing system.

An internal configuration (mainly software configuration) of the printing system 1000 will be described with reference to FIG. 2. FIG. 2 is a diagram showing an example of a control configuration of a printing system. The printing apparatus 100 comprises all units shown in FIG. 2 included in the printing system 1000 except the sheet processing apparatuses 200. Precisely, the sheet processing apparatuses 200 denote a series of sheet processing apparatuses that can be constituted by a plurality of in-line type sheet processing apparatuses. Thus, the sheet processing apparatuses 200 are sheet processing apparatuses detachable from the printing apparatus 100 and can be provided as an option of the printing apparatus 100. In this way, the POD system 10000 attains an advantage of providing a required number of required in-line finishers.

The printing apparatus 100 comprises a non-volatile memory, such as a hard disk 209 (hereinafter also called "HDD"), capable of storing data of a plurality of jobs to be processed, inside the printing apparatus 100. The printing apparatus 100 also comprises a copy function for a printer unit 203 to print, through the HDD, the job data accepted from a scanner unit 201 included in the printing apparatus 100. The printing apparatus 100 further comprises a print function for the printer unit 203 to print, through the HDD, the job data accepted from an external apparatus, such as the server PC 103 and the client PC 104, through an external I/F 202 unit as an example of a communication unit. The printing apparatus 100 is an MFP type printing apparatus (also called "image forming apparatus") comprising such a plurality of functions. However, the printing apparatus 100 may be a printing apparatus capable of color printing or a printing apparatus capable of monochrome printing as long as various controls described below can be executed.

The printing apparatus 100 comprises the scanner unit 201 that reads a document image and that executes image processing to the read image data. The printing apparatus 100 also comprises the external I/F 202 that transmits and receives image data, etc., to and from a facsimile, a network connection device, and an external dedicated apparatus. The printing apparatus 100 further comprises the hard disk 209 that can store image data of a plurality of jobs to be printed, the image data accepted from one of the scanner unit 201 and the external I/F 202. The printing apparatus 100 further comprises the printer unit 203 that applies a printing process of data of jobs to be printed stored in the hard disk 209 to a printing medium. The printing apparatus 100 further comprises the operation unit 204 that includes a display unit as an example of a user interface included in the printing system 1000. Other examples of user interfaces provided in the printing system 1000 include a display unit, a keyboard, and a mouse of external apparatuses of the server PC 103 and the client PC 104.

The control unit 205 included in the printing system 1000 comprehensively controls processes and operations of various units included in the printing system 1000. A ROM 207, which is a read-only memory, stores a control program for executing various processes described below. The ROM 207 also stores a display control program for displaying various user interface screens (hereinafter, "UI screens") on a display unit of the operation unit 204 including the illustrated UI screens. The control unit 205 reads and executes the programs of the ROM 207 to cause the printing apparatus 100 to execute various operations. A RAM 208 is a readable and writable memory and stores image data, various programs, and setting information transmitted from the scanner unit 201 and the external I/F 202 through a memory controller 206.

The HDD (hard disk) 209 is a high-capacity storage device that stores image data compressed by a compressing/expanding unit 210. For example, the HDD 209 holds print data of jobs to be processed. The control unit 205 controls the printer unit 203 to allow printing, through the HDD 209, job data to be processed that is inputted through various input units such as the scanner unit 201 and the external I/F 202. The control unit 205 also controls to allow transmission of data to an external apparatus through the external I/F 202. In this way, the control unit 205 controls to allow execution of various output processes of job data to be processed that is stored in the HDD 209. The compressing/expanding unit 210 compresses and expands image data, etc., stored in the RAM 208 and the HDD 209 by various compression methods such as JBIG and JPEG.

Based on the configuration, the control unit 205 as an example of a control unit included in the present printing system also controls operations of the in-line type sheet processing apparatuses 200 as in the description of FIG. 1.

<Device Configuration of Printing System>

Figure 3:
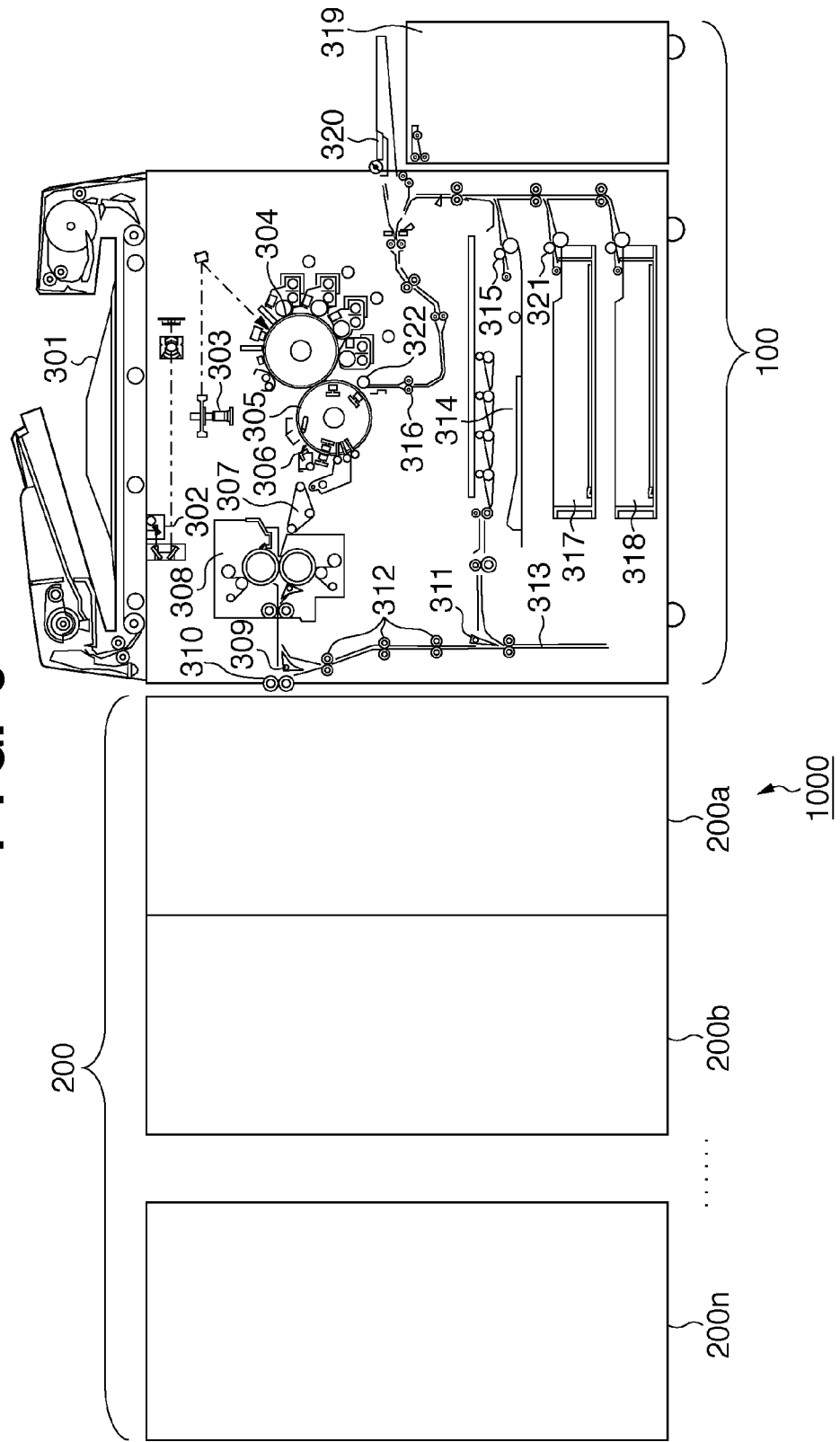
FIG. 3 is a diagram showing an example of a device configuration of the printing system.

A configuration (mainly mechanical configuration) of the printing system 1000 will be described with reference to FIG. 3. FIG. 3 is a diagram showing an example of a device configuration of the printing system. As described, the present printing system 1000 is capable of cascade connection of a plurality of in-line type sheet processing apparatuses to the printing apparatus 100. An arbitrary number of in-line type sheet processing apparatuses being capable of connection to the printing apparatus are arranged under specific restrictions and in accordance with the use environment to improve the effects of the present embodiment. Therefore, to further clarify the description, N sheet processing apparatuses 200 can be connected as a series of sheet processing apparatuses in FIG. 3. The sheet processing apparatuses are illustrated as 200a and 200b in the order from the first sheet processing apparatus, and an N-th sheet processing apparatus is illustrated as a sheet processing apparatus 200n.

A mechanical configuration for executing a printing process in the printing apparatus 100 will be described first. Among reference numerals 301 to 322 shown in FIG. 3, reference numeral 301 denotes a mechanical configuration of the scanner unit 201 of FIG. 2. Reference numerals 302 to 322 denote a mechanical configuration of the printer unit 203 of FIG. 2.

An automatic document feeder (ADF) 301 separates batches of documents set on the loading surface of a document tray in page order from the document of the first page and transfers the documents to a platen glass for a scanner 302 to scan the documents. The scanner 302 reads images of the documents transferred to the platen glass, and a CCD converts the images into image data. A rotating multifaceted mirror (such as polygonal mirror) 303 allows a light beam, such as a laser beam, modulated according to the image data to enter and directs the light beam as reflected scan light to a photosensitive drum 304 through a reflecting mirror. Toners develop a latent image formed on the photosensitive drum 304 by the laser beam, and the toner image is transferred to a sheet material attached to a transfer drum 305. The series of image forming processes are sequentially executed for yellow (Y), magenta (M), cyan (C), and black (K) toners to form a full-color image. After four image processing processes, a separating claw 306 separates the sheet material on the transfer drum 305 on which an image is formed. A pre-fuse feeder 307 transfers the sheet material to a fuser 308.

The fuser 308 is constituted by a combination of rollers and a belt and includes a heat source such as a halogen heater. The fuser 308 uses heat and pressure to fuse the toners on the sheet material on which a toner image is transferred. A discharge flapper 309 is configured to be able to swing about the pivot shaft and provides a feeding direction of the sheet material. When the discharge flapper 309 swings clockwise in FIG. 3, the sheet material is straightly transferred and discharged to the outside by a discharge roller 310. Meanwhile, the discharge flapper 309 swings counterclockwise in FIG. 3 to form images on both sides of the sheet material. The course of the sheet material is changed downward, and the sheet material is sent to a double-sided feeder. The double-sided feeder comprises a reverse flapper 311, reverse rollers 312, a reverse guide 313, and a double-sided tray 314.

The reverse flapper 311 is configured to be able to swing about the pivot shaft and provides a feeding direction of the sheet material. To process a double-sided print job, the control unit 205 controls to swing the sheet, in which the printer unit 203 has printed on a first surface of the sheet, counterclockwise in FIG. 3 through the reverse flapper 311 and send the sheet to the reverse guide 313 through the reverse rollers 312. The control unit 205 temporarily stops the reverse roller 312 with the back end of the sheet material placed between the reverse rollers 312 and then swings the reverse flapper 311 clockwise in FIG. 3. The control unit 205 also rotates the reverse roller 312 in the opposite direction. In this way, the sheet is switched back and transferred, and the control unit 205 controls to deliver the sheet to the double-sided tray 314 with the back end and the leading end of the sheet being switched.

The double-sided tray 314 temporarily loads the sheet material, and a paper refeeding roller 315 sends the sheet material again to resist rollers 316. In the transmitted sheet material, the surface opposite the first surface in the transferring process faces the photosensitive drum. An image of a second surface is formed on the second surface of the sheet in the same way as the process described above. Images are formed on both sides of the sheet material, and after a fusing process, the sheet is discharged from inside the main body of the printing apparatus to the outside through the discharge roller 310. The control unit 205 executes the series of double-sided printing sequences to allow the present printing apparatus to perform double-sided printing on the first and second surfaces of the sheet of job data subject to double-sided printing.

Examples of paper feeding units include paper feeding cassettes 317 and 318 (for example, each can accommodate 500 sheets), a paper deck 319 (for example, capable of storing 5000 sheets), and a manual feed tray 320 or the like serving as paper feeding units that store sheets required in the printing process. Examples of units that transfer sheets stored in the paper feeding units include a paper feeding roller 321 and the resist rollers 316 or the like. The paper feeding cassettes 317, 318 and the paper deck 319 are configured to be able to segregate and set the sheets of various sheet sizes and various materials in each paper feeding unit.

The manual feed tray 320 is also configured to be able to set various printing media including special sheets such as OHP sheets. The paper feeding roller 321 is arranged on each of the paper feeding cassettes 317, 318, the paper deck 319, and the manual feed tray 320, and the sheets can be continuously transferred one by one. For example, a pickup roller sequentially delivers loaded sheet materials, and a separation roller arranged opposite the paper feeding roller 321 prevents multi feeding. The sheet materials are sent out to a feeding guide one by one. Driving force for rotation in the opposite direction from the feeding direction is inputted to the separation roller through a torque limiter not shown. If only one piece of sheet material enters a nip unit formed between the separation roller and the paper feeding roller, the separation roller rotates in the feeding direction, following the sheet material.

On the other hand, the separation roller rotates in the opposite direction from the feeding direction if multi feeding occurs. The multi-fed sheet materials are returned, and only the uppermost one piece is sent out. The sent out sheet material is guided between the feeding guides, and a plurality of feeding rollers transfer the sheet material to the resist rollers 316. The resist rollers 316 are stopped at this point, and the leading end of the sheet material reaches a nip formed by the pair of resist rollers 316. The sheet material forms a loop, and an oblique is corrected. The resist rollers 316 then start rotating to transfer the sheet material in accordance with the timing of the toner image formed on the photosensitive drum 304 by the image forming unit. An adsorbing roller 322 electrically adsorbs the sheet material transmitted from the resist rollers 316 on the surface of the transfer drum 305. The sheet material discharged from the fuser 308 is guided to the sheet path inside the sheet processing apparatus 200 through the discharge roller 310.

<Configuration of Operation Unit in Printing System>

Figure 4:
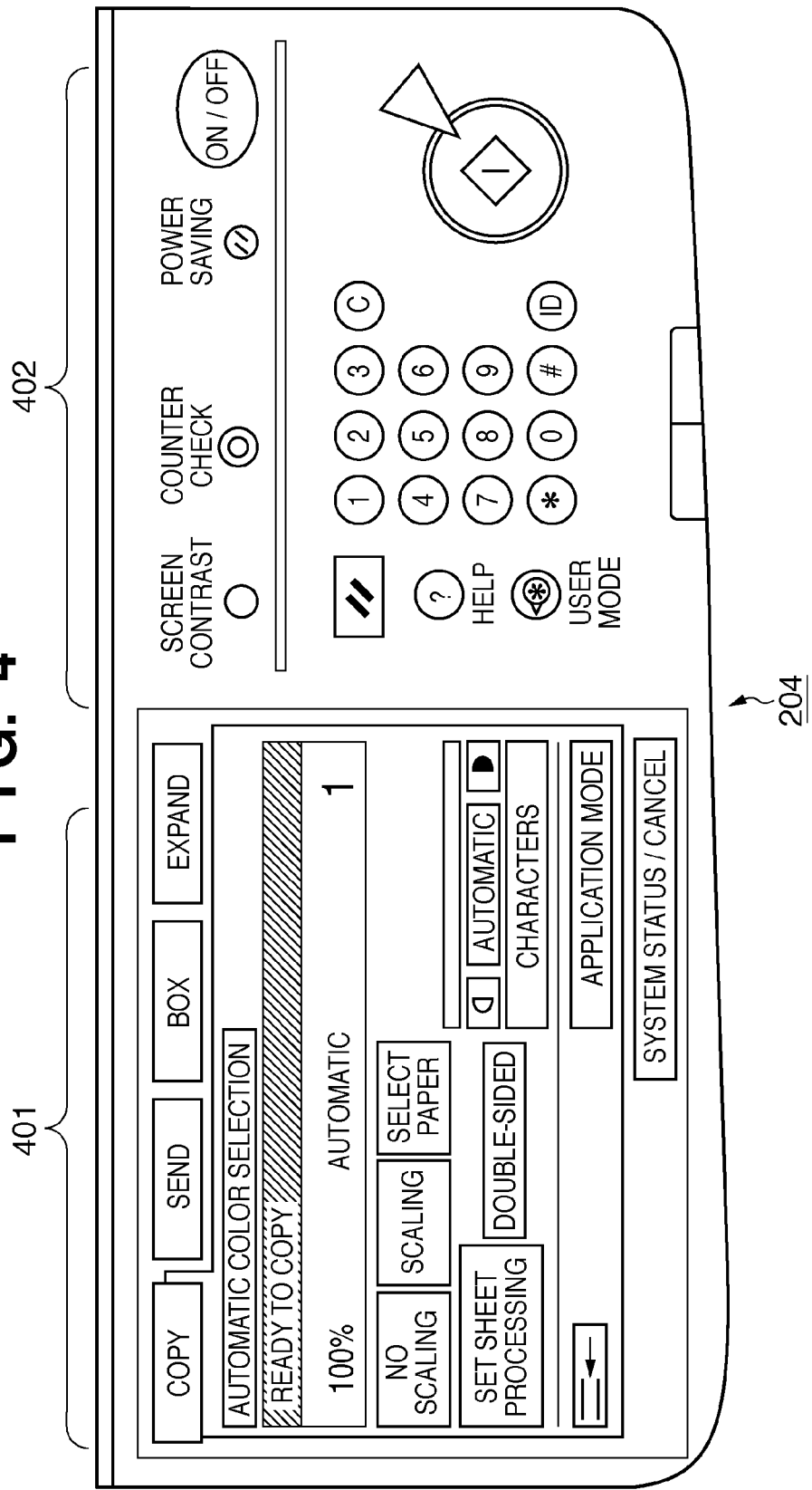
FIG. 4 is a diagram showing a configuration example of an operation unit of a printing apparatus.

The operation unit 204 as an example of a user interface unit (hereinafter "UI unit") included in the printing apparatus 100 of the printing system 1000 will be described with reference to FIGS. 4 to 6. FIG. 4 is a diagram showing a configuration example of the operation unit of the printing apparatus.

As shown in FIG. 4, the operation unit 204 comprises a key input unit 402 that can accept a user operation by a hard key and a display unit 401 as an example of a display unit that can accept a user operation by a soft key (display key). The display unit 401 is constituted by a touch panel and is capable of accepting user operations through displayed soft keys.

Figure 5:
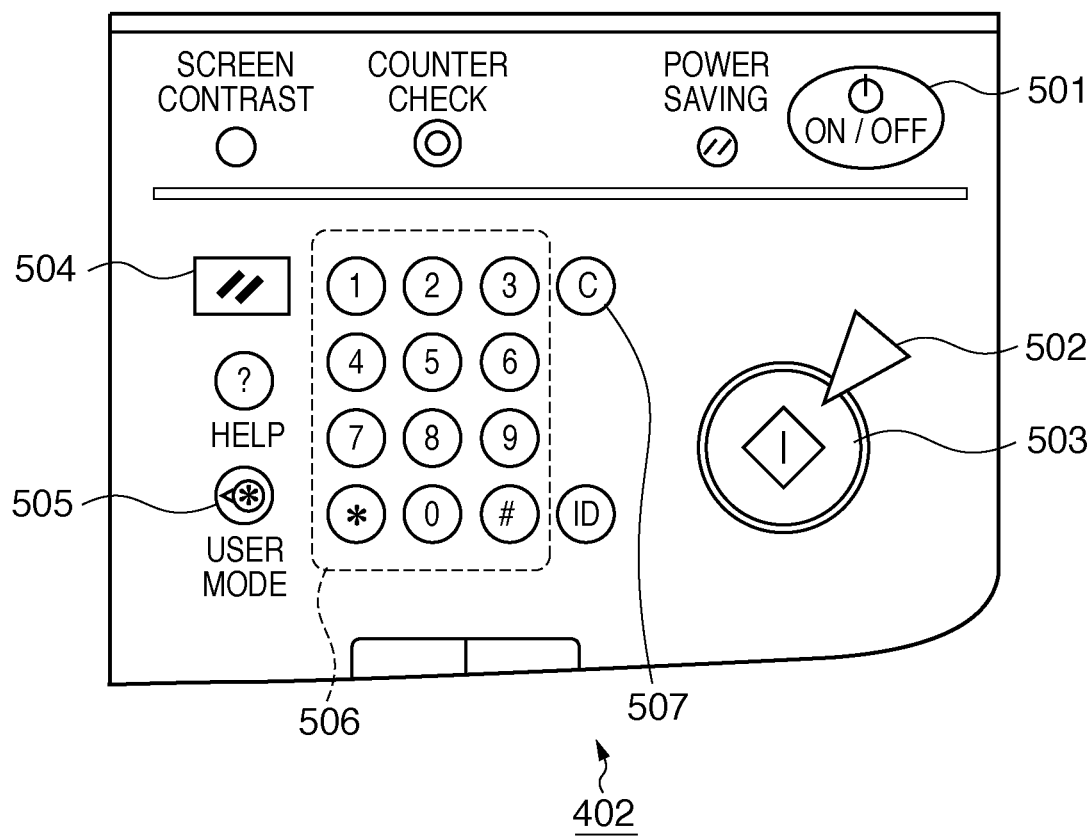
FIG. 5 is a diagram showing a configuration example of a key input unit.

FIG. 5 is a diagram showing a configuration example of a key input unit. As shown in FIG. 5, the key input unit 402 comprises an operation unit power switch 501. The control unit 205 controls to selectively switch a standby mode and a sleep mode when the operation unit power switch 501 is pressed. The standby mode denotes a normal operation state in which all functions such as printing can be executed. The sleep mode denotes a state in which the program is stopped in an interrupt waiting state in preparation for network printing or facsimile to reduce the power consumption. The control unit 205 controls to accept a user operation of the operation unit power switch 501 when the main power switch for supplying power to the entire system is ON.

A start key 503 is a key for allowing acceptance of an instruction from the user to cause the printing apparatus 100 to start a job process of the type instructed by the user, such as a copy operation and a transmission operation of a job to be processed. A stop key 502 is a key for allowing acceptance of an instruction from the user to cause the printing apparatus 100 to stop processing the accepted job. A numeric keypad 506 denotes keys for allowing the user to set various setting values. A clear key 507 is a key for canceling various parameters set by the user through the numeric keypad 506. A reset key 504 is a key for canceling all various settings set by the user to the job to be processed and accepting an instruction from the user to return the set values to the default state. A user mode key 505 is a key for shifting to the system setting screen of each user.

Figure 6:
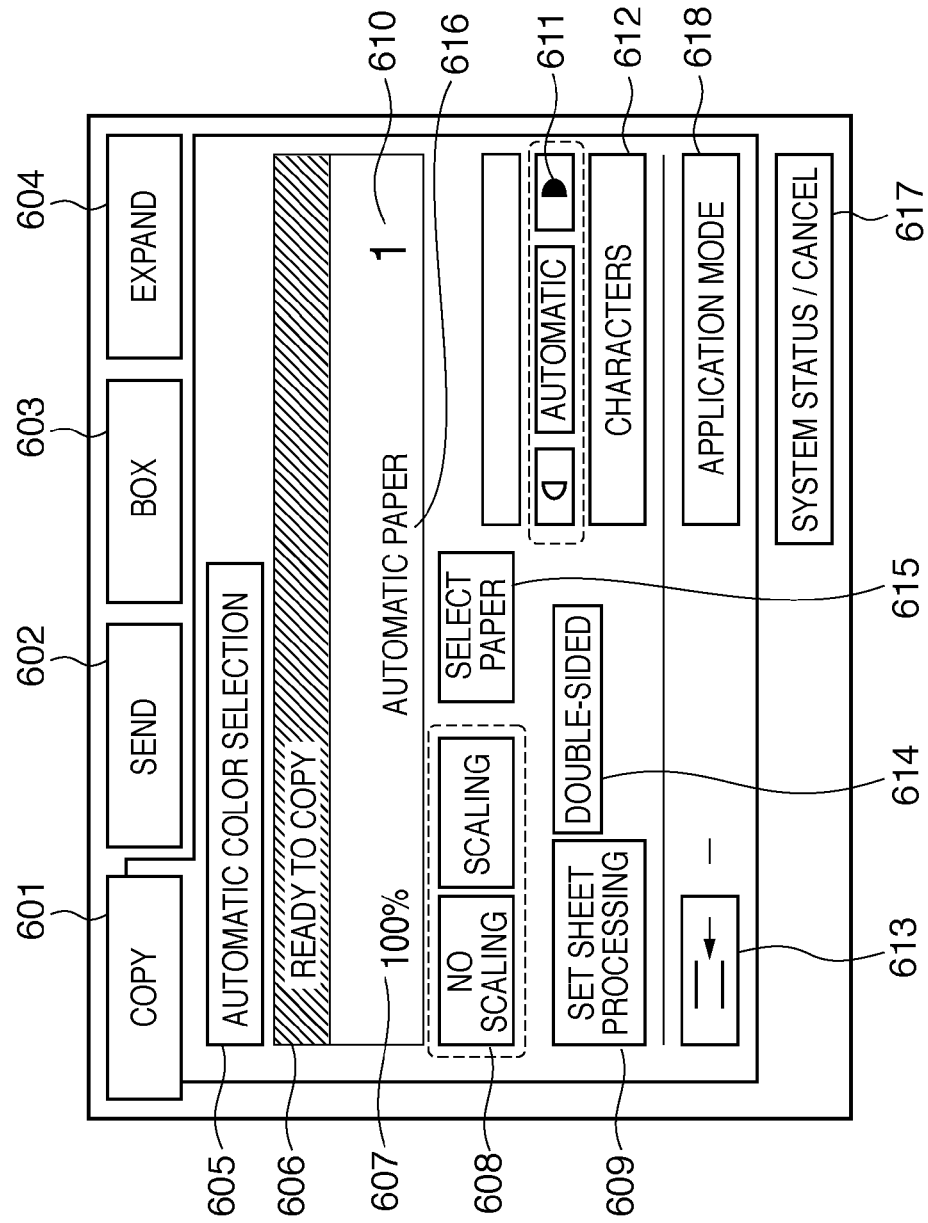
FIG. 6 is a diagram showing a configuration example of a screen displayed on a display unit.

FIG. 6 is a diagram showing a configuration example of a screen displayed on the display unit. The display unit 401 comprises an LCD (Liquid Crystal Display) and a touch-panel display formed of a transparent electrode attached on the LCD. The display unit 401 includes a function for accepting various settings from the operator as well as a function for presenting information to the operator. For example, when the control unit 205 detects that the user has pressed a portion of a display key in an effective display state on the LCD, the control unit 205 displays an operation screen corresponding to the key operation in accordance with a display control program stored in advance in the ROM 207. The display example shown in FIG. 6 is an example of an initial screen displayed on the display unit 401 when the printing apparatus 100 is in the standby mode (state in which there is no job to be processed by the printing apparatus 100).

If the user presses a copy tab 601 shown in FIG. 6, the control unit 205 displays an operation screen of a copy function included in the printing apparatus 100 on the display unit 401. If the user presses a transmission tab 602, the control unit 205 displays an operation screen of a data transmitting (Send) function, such as FAX and E-mail transmission, included in the present printing apparatus on the display unit 401. If the user presses a box tab 603, the control unit 205 displays an operation screen of a box function included in the printing apparatus 100 on the display unit 401. Contents of screens and buttons displayed when each tab is selected will be omitted herein.

<System Configuration of Printing System>

Figure 7:
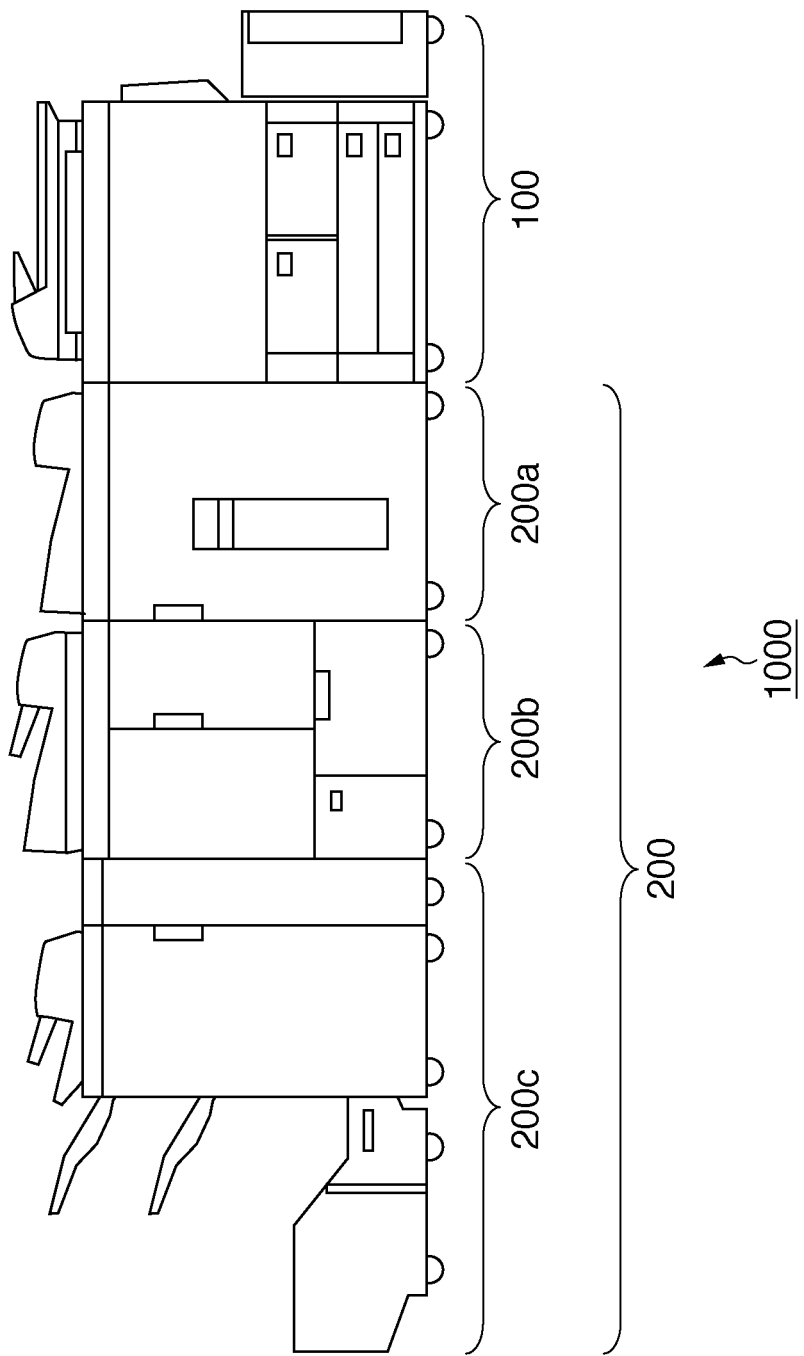
FIG. 7 is a diagram showing a system configuration example of the printing system.

A possible configuration example of the printing system 1000 includes a system configuration as shown in FIG. 7, for example. FIG. 7 is a diagram showing a system configuration example of the printing system. In the system configuration example shown in FIG. 7, the printing system 1000 comprises three in-line type sheet processing apparatuses, a high-capacity stacker, a glue binding apparatus, and a saddle stitching apparatus, which serve as a series of sheet processing apparatuses 200. A connection to the printing apparatus 100 is made in the order of the high-capacity stacker, the glue binding apparatus, and the saddle stitching apparatus. The control unit 205 comprehensively controls the printing system 1000 formed by the system configuration shown in FIG. 7.

A high-capacity stacker 200a is a sheet processing apparatus that can load a large amount of sheets (for example, 5000 sheets) from the printer unit 203. A glue binding apparatus 200b is a sheet processing apparatus that can execute a case binding process requiring a gluing process of sheet to bind a batch of sheets printed by the printer unit 203 with a cover. The glue binding apparatus 200b can also execute a top glue binding process that is a sheet process of glue binding without attaching a cover. The glue binding apparatus 200b is a sheet processing apparatus that can at least execute a case binding process. Therefore, the glue binding apparatus 200b is also called a case binding apparatus. A saddle stitching apparatus 200c is a sheet processing apparatus that can selectively apply a stapling process, a punching process, a sheet cutting process, shift discharging, a saddle stitching process, and a folding process to the sheets from the printer unit 203.

Thus, a wide variety of sheet processes are possible in the present printing system 1000, and the fact that these processes are possible is registered in the HDD 209 as configuration information. Therefore, the control unit 205 controls the UI unit based on the configuration information so that all sheet processes can be selected. Detailed description of the finishers will be omitted herein.

A highly important point of the present invention will be further described. As described above, adopting the configuration of the present POD system 10000 allows acceptance of a plurality of sheet processes for one print job. However, there is also a problem to be solved when executing the plurality of processes.

Specifically, for example, stapling and punching processes can be simultaneously executed to the entire job of one print job, and there may also be a need for that. However, the output material is meaningless if the stapling process is executed for the entire print job while the punching process is executed only for part of the print job, and the setting of the job is estimated to be clearly wrong. In such a case, if a large amount of printed materials considered to have a wrong setting is output, there is a fear of wasted cost and time in the POD industry that treats the printed materials as products.

Therefore, a print control system that can flexibly accept complicated settings while reducing unnecessary costs as much as possible is important. FIGS. 13 and 14 depict combination tables of finishing setting. A combination table 1300 shown in FIG. 13 is a combination table when finishing setting is established for the entire job and part of the job (hereinafter, "individual finishing setting"). A combination table 1310 shown in FIG. 14 is a combination table when finishing setting is established for the entire job. The present POD system 10000 holds the combination tables 1300 and 1310 in advance within the system. In FIGS. 13 and 14, "○" indicates possible output materials. On the other hand, "x" indicates output materials unnecessary for the user. Thus, the combination table 1300 defines predetermined overall processes and configurable combinations of individual processes. Meanwhile, the combination table 1310 defines predetermined overall processes and configurable combinations of other overall processes. The combination table 1300 is equivalent to first restriction information and second restriction information.

Not only the in-line type sheet processing apparatuses, but also the near-line type sheet processing apparatuses are taken into consideration in the combination tables 1300 and 1310. However, the content of the combination is different in each system configuration. For example, in the case of executing a punching process to the entire job and case binding to part of the job, there can certainly be an in-line type printing system in which the sheet cannot be transferred to another sheet processing apparatus after the case binding is performed by the case binding apparatus. In that case, the combination of the entire punching process and the case binding in individual finishing setting will not be operated. However, the combination can be operated if near-line type sheet processing apparatuses are also taken into consideration.

First Embodiment

A first embodiment will be described with reference to FIGS. 8 to 17. Scan job combining will be described in the present embodiment. The scan job combining is a function for allowing the automatic document feeder (ADF) 301 of FIG. 3 to accept batches of documents set on the loading surface while changing the setting for each batch and further allowing settings to be accepted for all accepted batches. The batches of documents are formed by segregating a plurality of sheets into subsets with a predetermined number of sheets.

Concerning the order of acceptance of the setting, for example, a process commonly applied to all batches of documents (overall process) can be selected first when an instruction of scan job combining is accepted. The individual processes applied to the batches of documents before scanning the batches of documents can then be accepted. Thus, the use of the present function allows acceptance of various settings in every certain amount of batches while accepting the setting for one entire print job. The settings are for post-processes (including overall processes and individual processes) applied to the sheets (paper) after printing.

Figure 8:
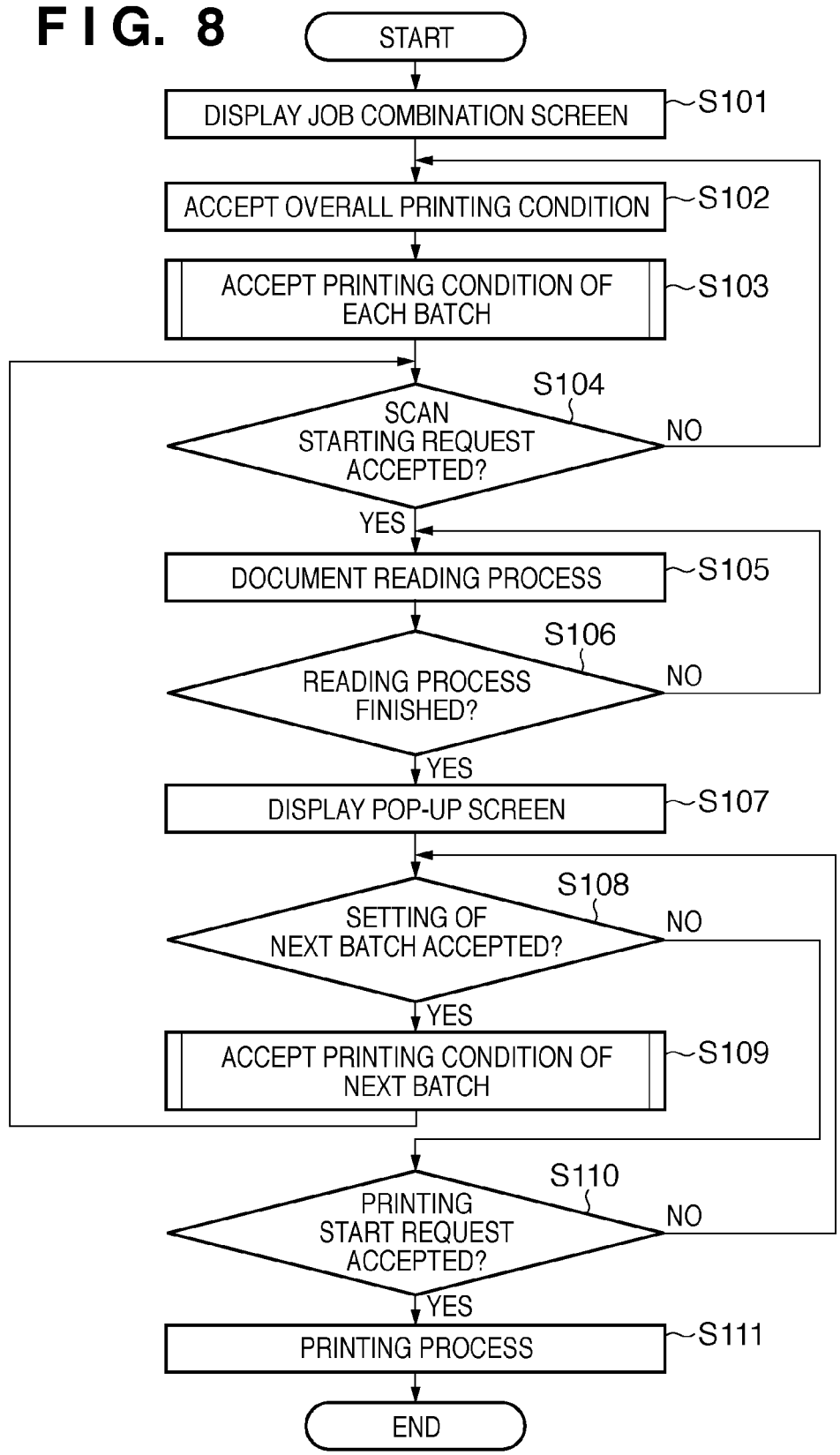
FIG. 8 is a flow chart showing a procedure when a scan job combining instruction is accepted according to a first embodiment.

FIG. 8 is a flow chart of a procedure when a scan job combining instruction is received according to the first embodiment. The control unit 205 of the printing apparatus 100 comprehensively controls the process described below.

Figure 9:
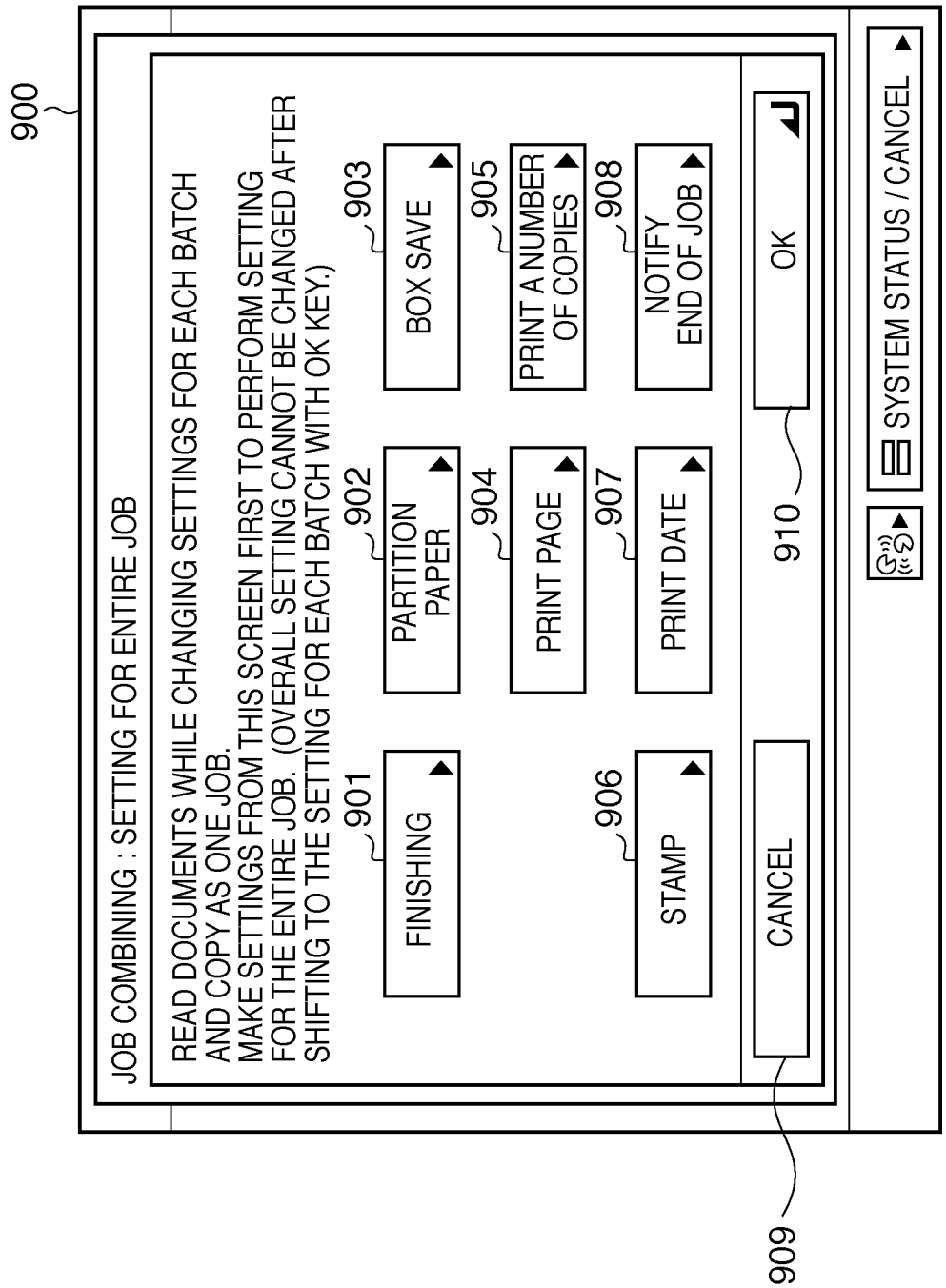
FIG. 9 is a diagram showing an example of a scan job combination screen.

After accepting an instruction of scan job combining, the control unit 205 displays a scan job combination screen 900 on a UI unit in step S101. FIG. 9 is a diagram showing an example of a scan job combination screen. The scan job combination screen 900 can accept setting for the entire scan job. As shown in FIG. 9, the display of the scan job combination screen 900 includes a finishing button 901, a partition paper button 902, a box save button 903, a page print button 904, a number of copies print button 905, and a stamp button 906. The display of the scan job combination screen 900 also includes a date print button 907, an end of job notification button 908, a cancel button 909, and an OK button 910. The user selects setting of post-processes for the entire job in the scan job combination screen 900.

Figure 10:
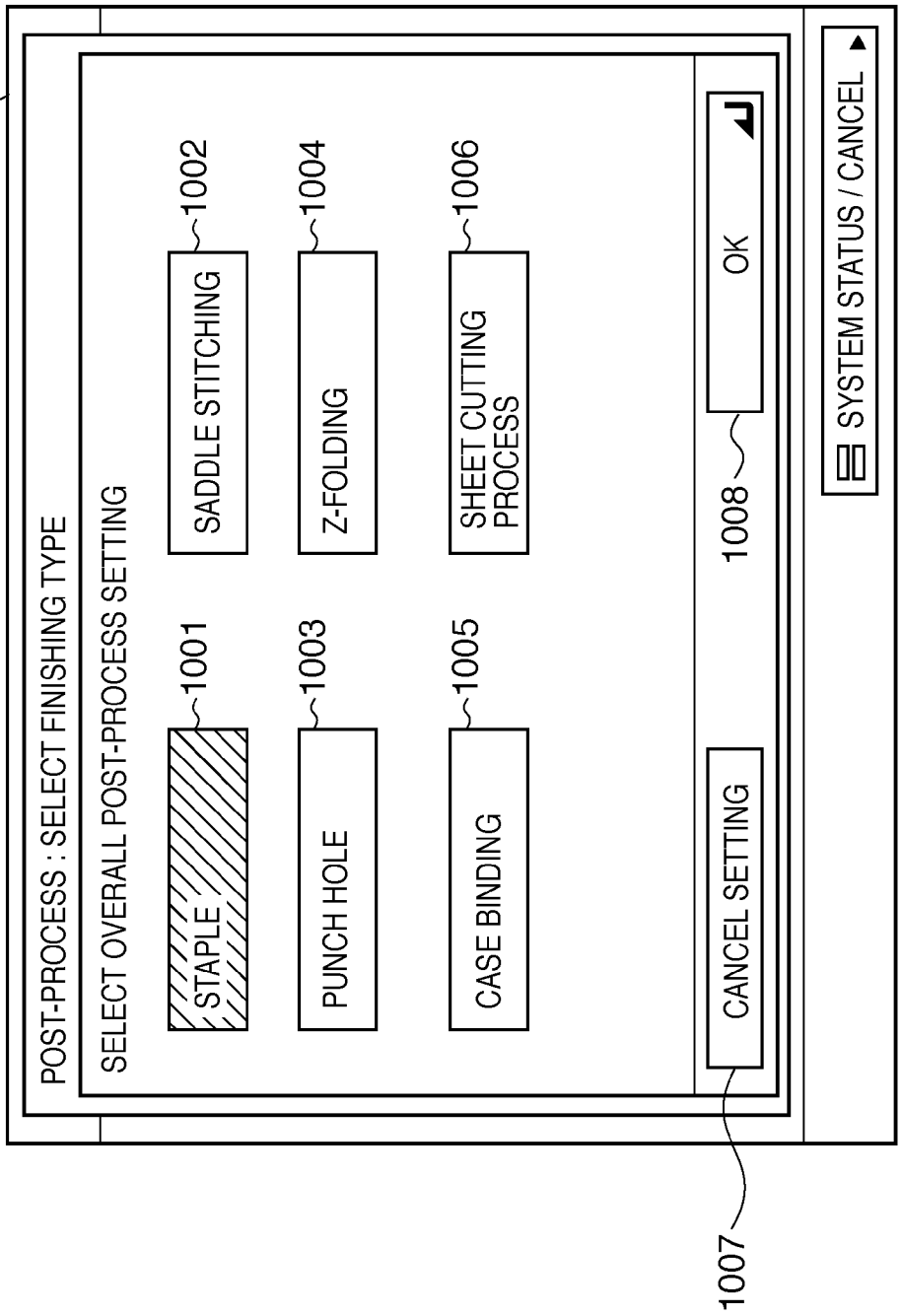
FIG. 10 is a diagram showing an example of a finishing type selection screen.

In step S102, the control unit 205 executes a control process according to the buttons displayed on the scan job combination screen 900. If the finishing button 901 is pressed, the control unit 205 displays a finishing type selection screen 1010 as shown in FIG. 10 on the UI unit. FIG. 10 is a diagram showing an example of a finishing type selection screen. As shown in FIG. 10, the display of the finishing type selection screen 1010 includes a staple button 1001, a saddle stitching button 1002, a punch hole button 1003, a z-folding button 1004, and a case binding button 1005 for executing sheet processes. The display of the finishing type selection screen 1010 also includes a sheet cutting process button 1006, a setting cancel button 1007, and an OK button 1008. The control unit 205 holds, in the RAM 208, sheet processing setting (printing condition) for the entire scan job based on the type of sheet processing selected when the OK button 1008 is pressed and displays the scan job combination screen 900.

If the partition paper button 902 is pressed, the control unit 205 holds setting for interleaving partition paper in the RAM 208. Similarly, if the box save button 903 is pressed, the control unit 205 holds setting for storing in a box in the RAM 208. Similarly, if the page print button 904, the number of copies print button 905, the stamp button 906, the date print button 907, and the end of job notification button 908 are pressed, the control unit 205 holds setting for executing the processes. In this way, the process of steps S101 and S102 is an example of an operation of an overall process setting unit.

Figure 12:
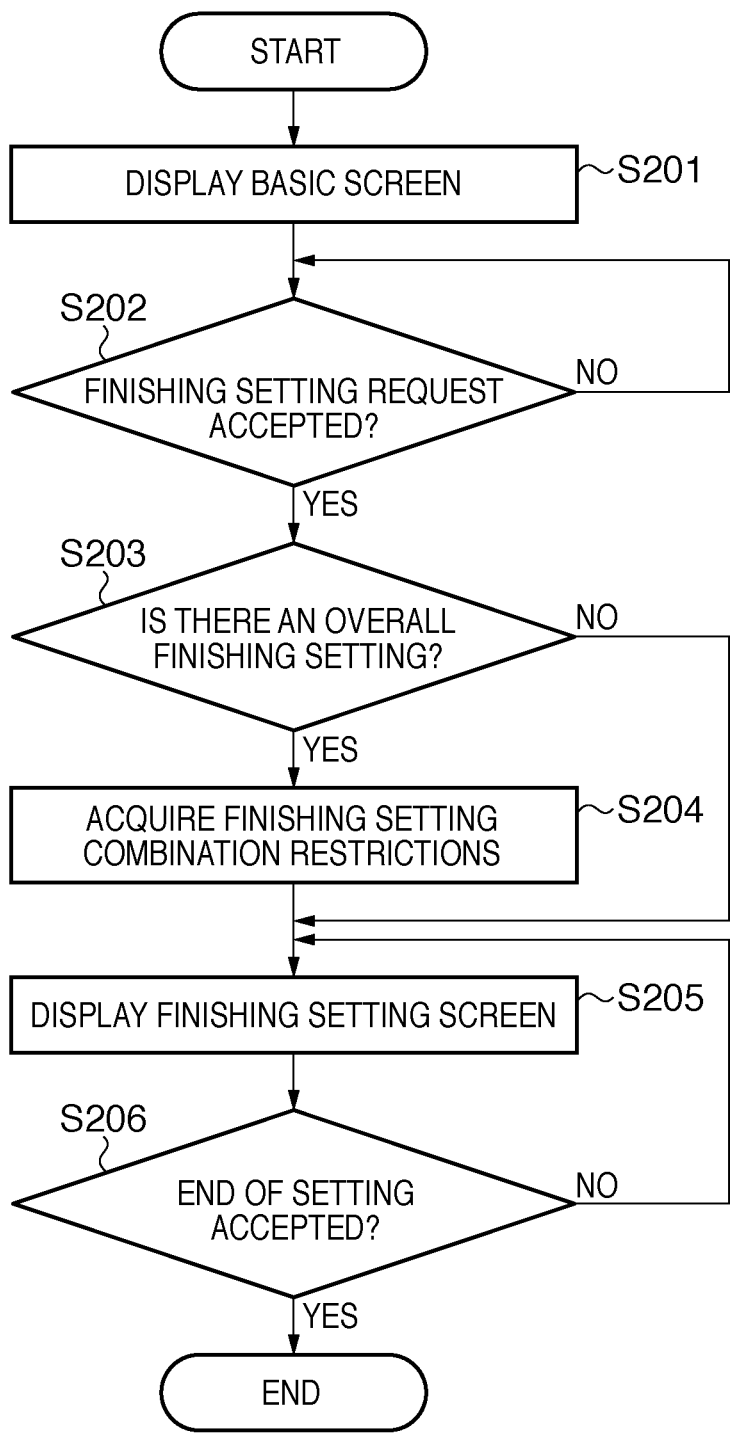
FIG. 12 is a flow chart showing a procedure for setting printing conditions of each batch.

If the OK button 910 is pressed on the scan job combination screen 900, the control unit 205 determines that the setting for the entire combined job is finished and proceeds to step S103. In step S103, the control unit 205 accepts setting of each of a plurality of batches (subsets) in the entire print job. Details of step S103 will be described with reference to FIG. 12. FIG. 12 is a flow chart of a procedure for setting a printing condition for each batch. The control unit 205 of the printing apparatus 100 comprehensively controls the process described below. The process described below is an example of an operation of an individual process setting unit.

Figure 11:
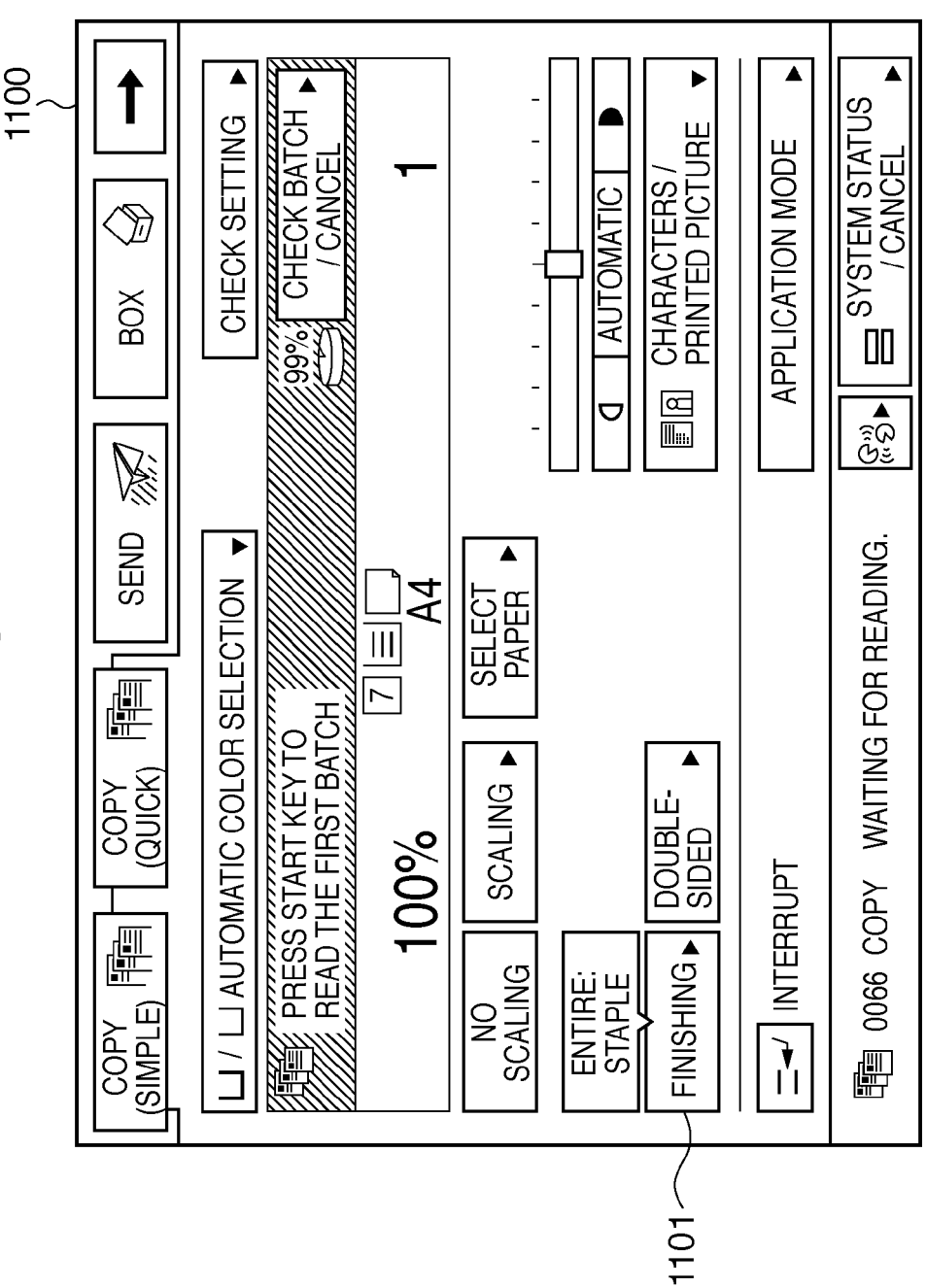
FIG. 11 is a diagram showing an example of a basic screen 1100 for combining batches of jobs.

In step S201, the control unit 205 controls display of a basic screen 1100 for combining batches of jobs in which the setting of the first batch can be changed. FIG. 11 is a diagram showing an example of the basic screen 1100. Settings of individual batches can be selected on the basic screen 1100. The basic screen 1100 is different from the basic screen shown in FIG. 6 in that a finishing setting button 1101 is included. Therefore, the control when the individual finishing setting button 1101 is pressed will be described below.

In step S202, the control unit 205 determines whether the individual finishing setting button 1101 is pressed. If the control unit 205 determines that the individual finishing setting button 1101 is pressed, the control unit 205 proceeds to step S203. In step S203, the control unit 205 determines whether finishing setting for the entire job is accepted with reference to the setting held in the RAM 208. If the finishing setting for the entire job is not accepted, the control unit 205 proceeds to step S205. On the other hand, if the finishing setting for the entire job is accepted, the control unit 205 proceeds to step S204.

In step S204, the control unit 205 acquires the combination table 1300 of overall finishing setting and individual finishing setting from the HDD 209. The combination table 1300 defines unnecessary combinations and selectable combinations when the overall finishing setting and the individual finishing setting are combined. Only combinations of stapling, punching process, z-folding, sheet cutting process, case binding, and saddle stitching are listed in the present embodiment. However, the combinations are not limited to these, and other combinations of settings are possible.

Figure 15:
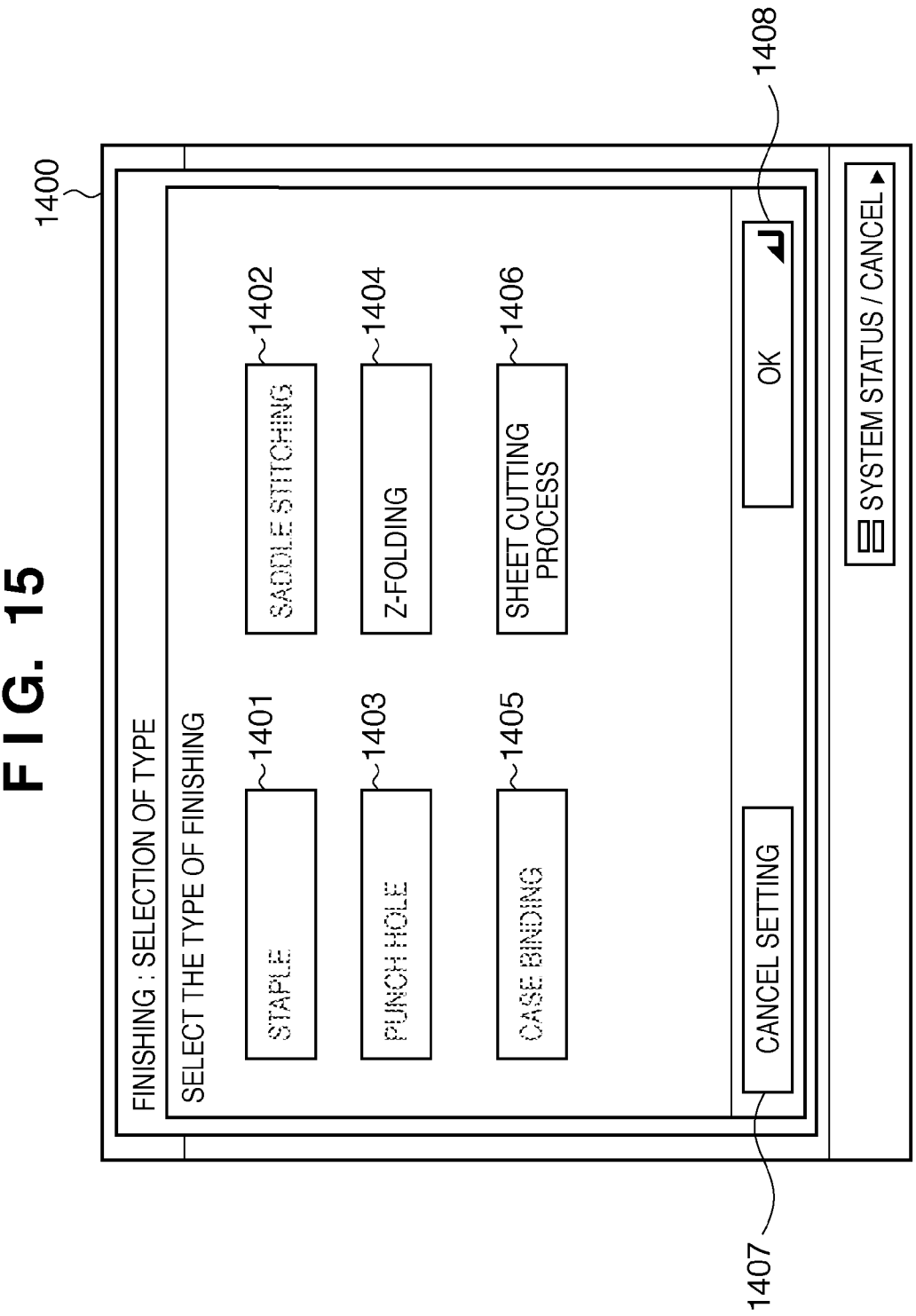
FIG. 15 is a diagram showing an example of a finishing setting process screen.

In step S205, in accordance with the acquired combination of the finishing setting, the control unit 205 takes the previously acquired combination with finishing setting for the entire job into consideration to display a finishing setting process screen 1400 shown in FIG. 15. FIG. 15 is a diagram showing an example of a finishing setting process screen. The display of the finishing setting process screen 1400 includes a staple button 1401, a saddle stitching button 1402, a punch hole button 1403, a z-folding button 1404, a case binding button 1405, a sheet cutting process button 1406, a setting cancel button 1407, and an OK button 1408. The overall finishing setting is taken into consideration, and the buttons related to prohibited individual finishing setting among the buttons 1401 to 1406 for setting a post-process are grayed out and displayed so that a selection cannot be made.

The finishing setting process screen 1400 shows a screen when stapling is selected as an overall finishing process. When stapling is selected as an overall finishing process, the control unit 205 activates only the z-folding button 1404 and the sheet cutting process button 1406 for the individual finishing setting and grays out other buttons.

For example, considering the combination with the punching process, there is usually no problem in the combination of the stapling and the punching process when a plurality of overall finishing settings are combined, and the user may need the combination. However, if the overall finishing setting is the stapling, and the punching process is selected as the individual finishing setting, it is clear that punch holes in part of a stapled printed material are meaningless. Thus, such a setting can be estimated as a user's mistake. Therefore, in the present embodiment, the control unit 205 controls in advance so that meaningless settings cannot be selected to prevent such a mistake.

In step S206, the control unit 205 determines whether the OK button 1408 is pressed. If the OK button 1408 is pressed, the control unit 205 stores the selected individual finishing setting in the RAM 208 and proceeds to step S104 of FIG. 8.

In step S104, the control unit 205 determines whether the start key 503 of the key input unit 402 of job is pressed. If the start key 503 is pressed, the control unit 205 proceeds to step S105 and starts scanning batches of documents on the loading unit of the ADF 301.

Figure 16:
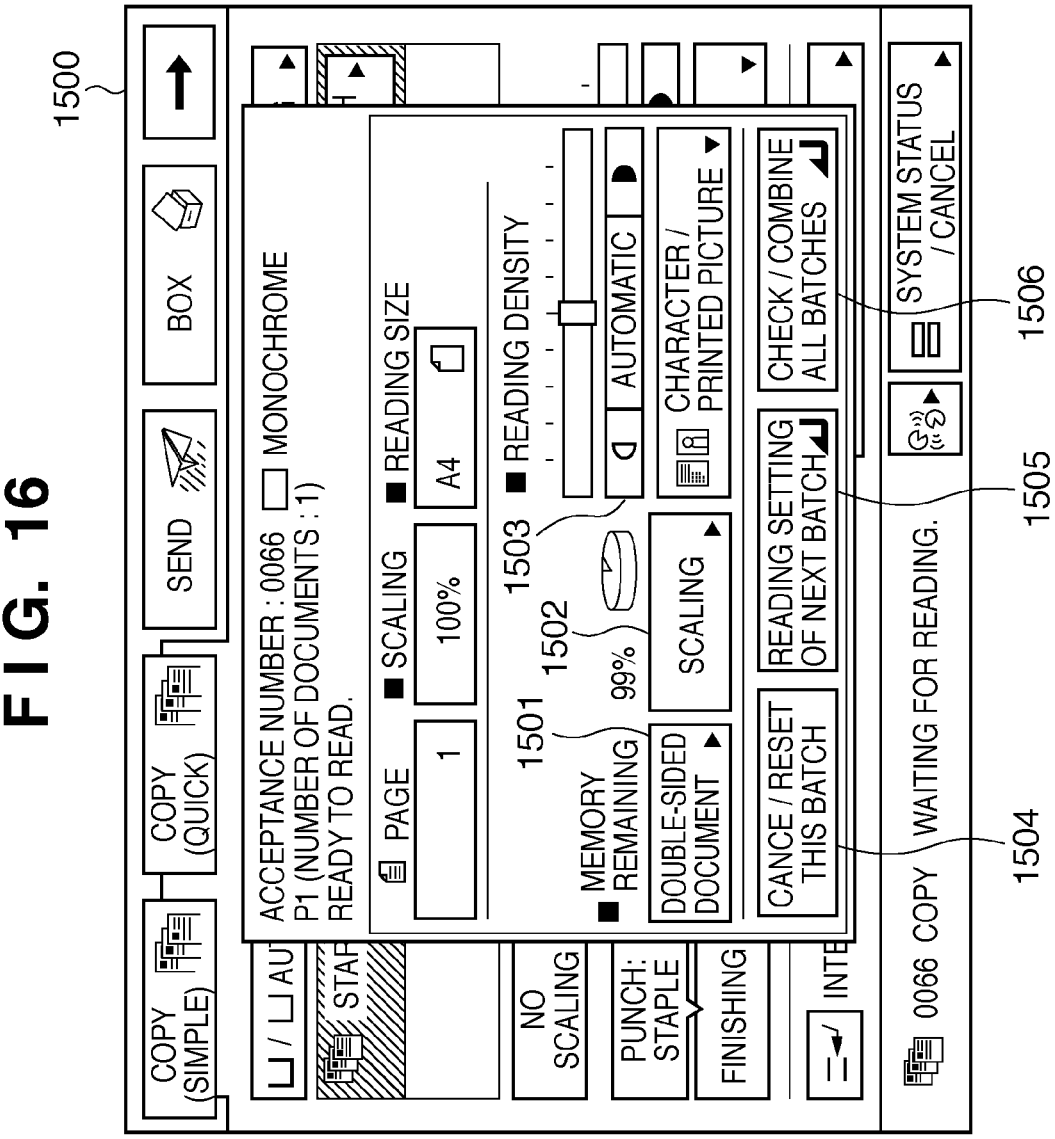
FIG. 16 is a diagram showing an example of a pop-up screen 1500.

In step S106, the control unit 205 determines whether scanning of all batches of documents on the loading unit of the ADF 301 is finished. The control unit 205 proceeds to step S107 if determining that the scanning process is finished and displays a pop-up screen 1500 shown in FIG. 16. FIG. 16 is a diagram showing an example of the pop-up screen 1500. The display of the pop-up screen 1500 includes a double-sided document button 1501, a scale button 1502, and a density setting button 1503 for setting the next batch. The setting can also be changed on the basic screen 1100 displayed when a reading setting change button 1505 of the next batch is pressed. If the setting buttons 1501 to 1503 are pressed, the control unit 205 can hold the accepted setting in the RAM 208.

After displaying the pop-up screen 1500, the control unit 205 determines in step S108 whether the reading setting change button 1505 of the next batch is pressed and proceeds to step S109 if the button is pressed. In step S109, the control unit 205 displays the basic screen 1100. The description of the procedures of reading setting after the second batch will not be repeated as the procedures are the same as the control described with reference to FIG. 12. When a change in the reading setting after the second batch is accepted, the control unit 205 returns to step S104 and determines whether the start key 503 is pressed.

Figure 17:
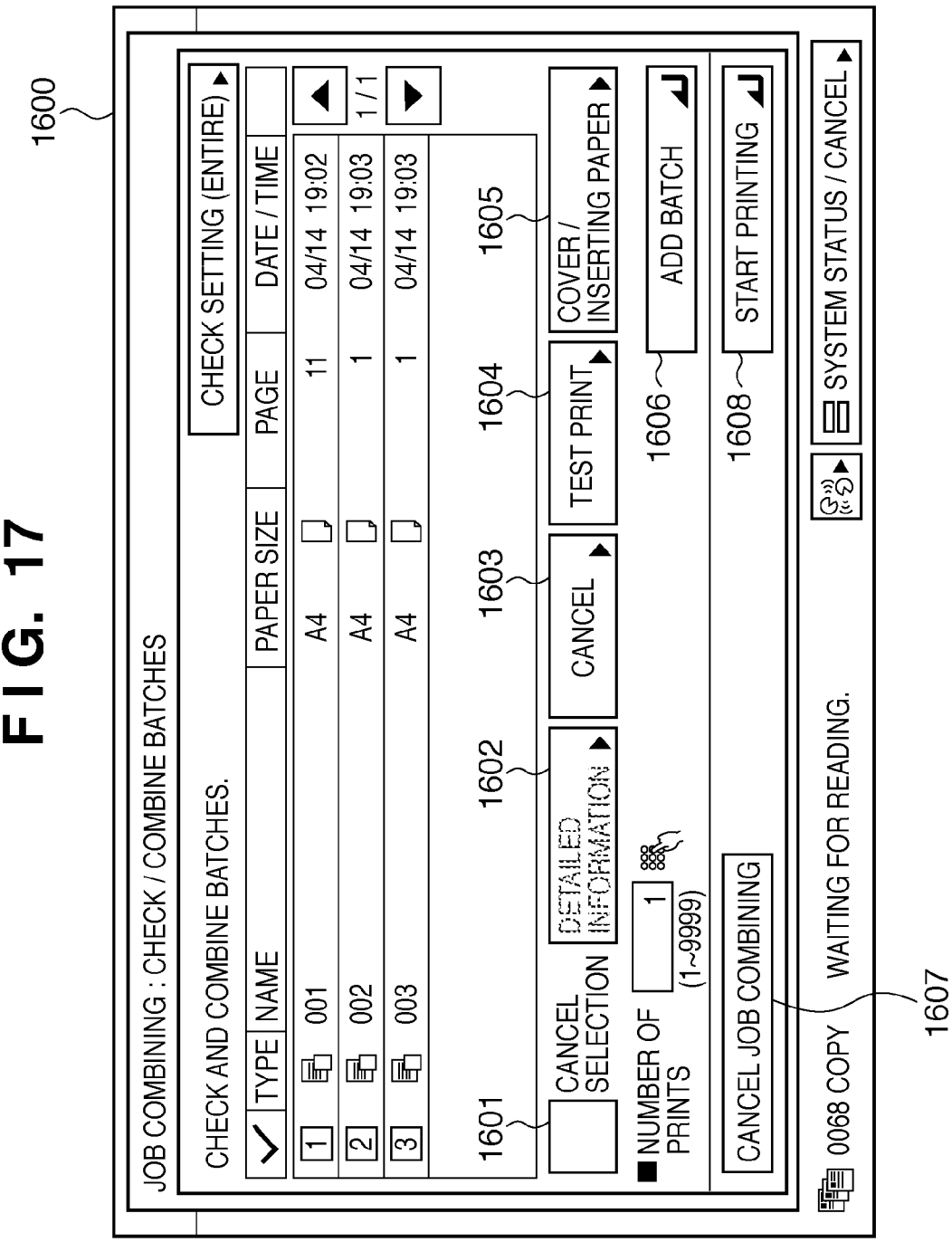
FIG. 17 is a diagram showing an example of a confirmation screen 1600 for combining batches of jobs.

Meanwhile, if a confirmation/combination button of all batches is pressed in step S108, the control unit 205 proceeds to step S110 to display a confirmation screen 1600 for combining batches of jobs shown in FIG. 17 and determines whether a printing start request is accepted. FIG. 17 is a diagram showing an example of the confirmation screen 1600. The display of the confirmation screen 1600 includes a selection cancel button 1601, a detailed information button 1602, a delete button 1603, and a test print button 1604. The display of the confirmation screen 1600 also includes a cover/inserting paper button 1605, a batch add button 1606, a job combining cancel button 1607, and a print start button 1608. The buttons 1601 to 1606 can be used to delete a read batch of jobs, check details, add a batch, etc.

If the print start button 1608 is pressed, the control unit 205 proceeds to step S111. The control unit 205 performs functions corresponding to the buttons and starts controlling the printing processes according to the print job settings accepted so far and held in the RAM 208.

As described, the finishing setting for each individual batch is controlled according to the finishing setting of the entire job accepted in advance when combining the scan jobs in the present embodiment. A flexible and economical setting flow can be provided to the user by adopting such a mechanism. Needs at actual workplaces in a printing environment of the POD or the like, such as a need to operate a system with as high productivity as possible and a need to reduce the workload of the operator as much as possible, can be handled. Particularly, the following effects can be achieved.

For example, when printed materials constituted by several booklets are collectively bound and stored in a ring binder, desired output materials can be easily obtained if original booklets are combined while leaving the post-process settings of the booklets. However, if such a flexible setting is allowed, unnecessary printed materials that may be impossible as an output material may also be generated. However, according to the present embodiment, the printing system holds, in advance, combinations of post-process settings that may be impossible. Therefore, a configuration can be formed so that unnecessary settings cannot be selected on the selection screens. In other words, flexible needs can be responded without unnecessary outputs and at low cost even if there are a multiplicity of complicated finishing settings.

Second Embodiment

A second embodiment will be described with reference to FIGS. 18A to 21. In the present embodiment, the control when finishing setting for each individual batch is accepted in advance and then finishing setting for the entire job is accepted will be described. Hold job combining will be described in the present embodiment as an example of suitable application.

The hold job is a job for temporarily holding, in the HDD 209 of the printing apparatus 100, print data of job transmitted from an information processing apparatus, such as the PCs 103 and 104, through the network 101. The operator who operates the printing apparatus 100 changes the setting and manages the held data. The status of the sheet processing apparatus 200 in the printing system 1000, the use status of the printing apparatus 100, and the operation instruction for the inputted data are taken into consideration in the setting change and management. Not only can various settings be established on the spot for the hold job inputted to the printing apparatus 100, but the hold job can be combined with another hold job to form a new job.

Figure 18A:
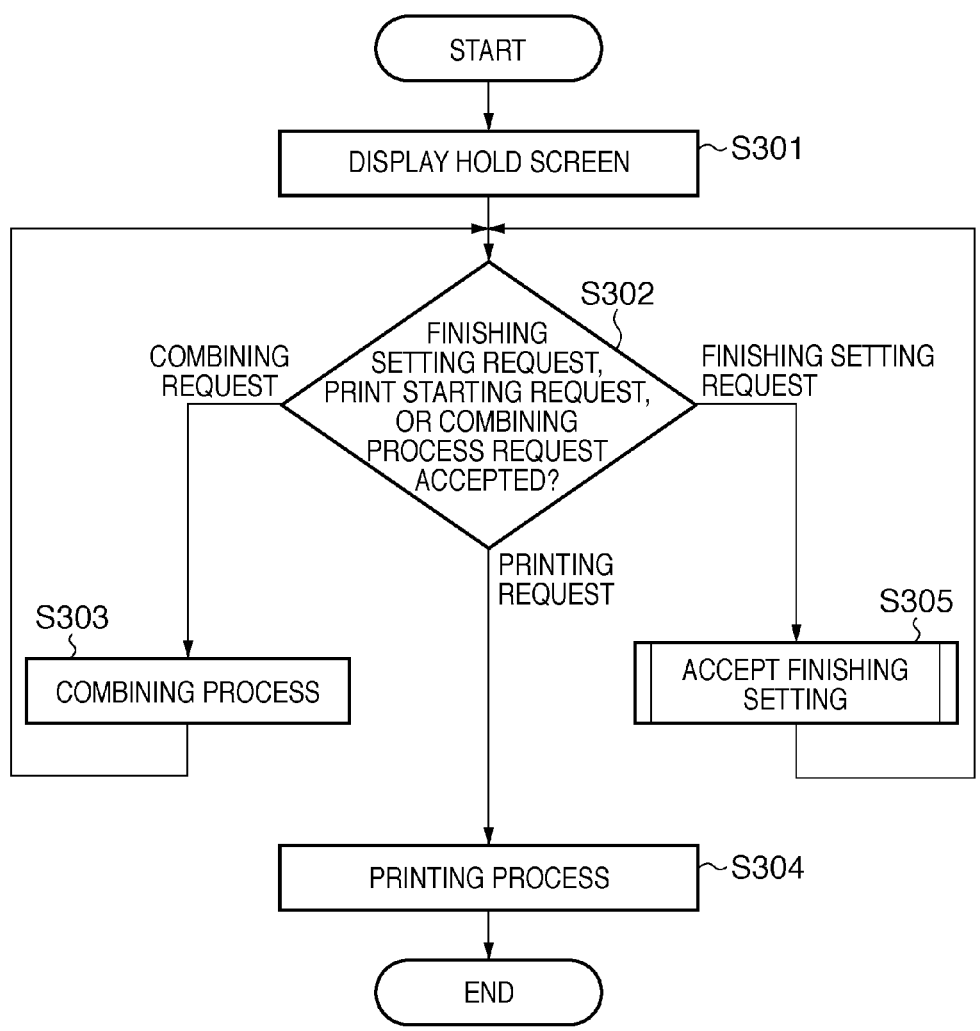
FIG. 18A is a flow chart showing a procedure when a print instruction of a hold job is accepted according to a second embodiment.
Figure 20:
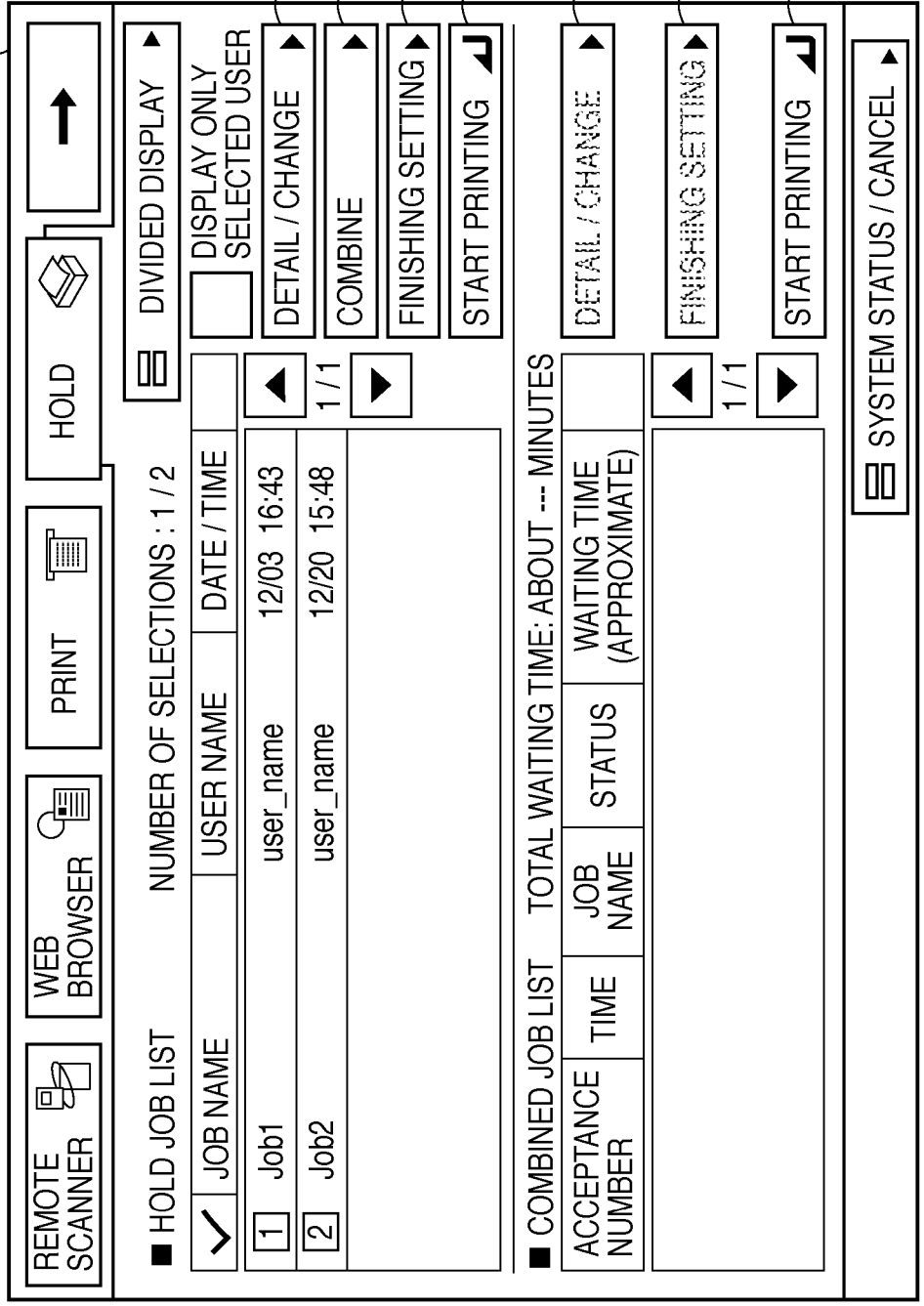
FIG. 20 is a diagram showing an example of a hold tab basic screen 1900.
Figure 21:
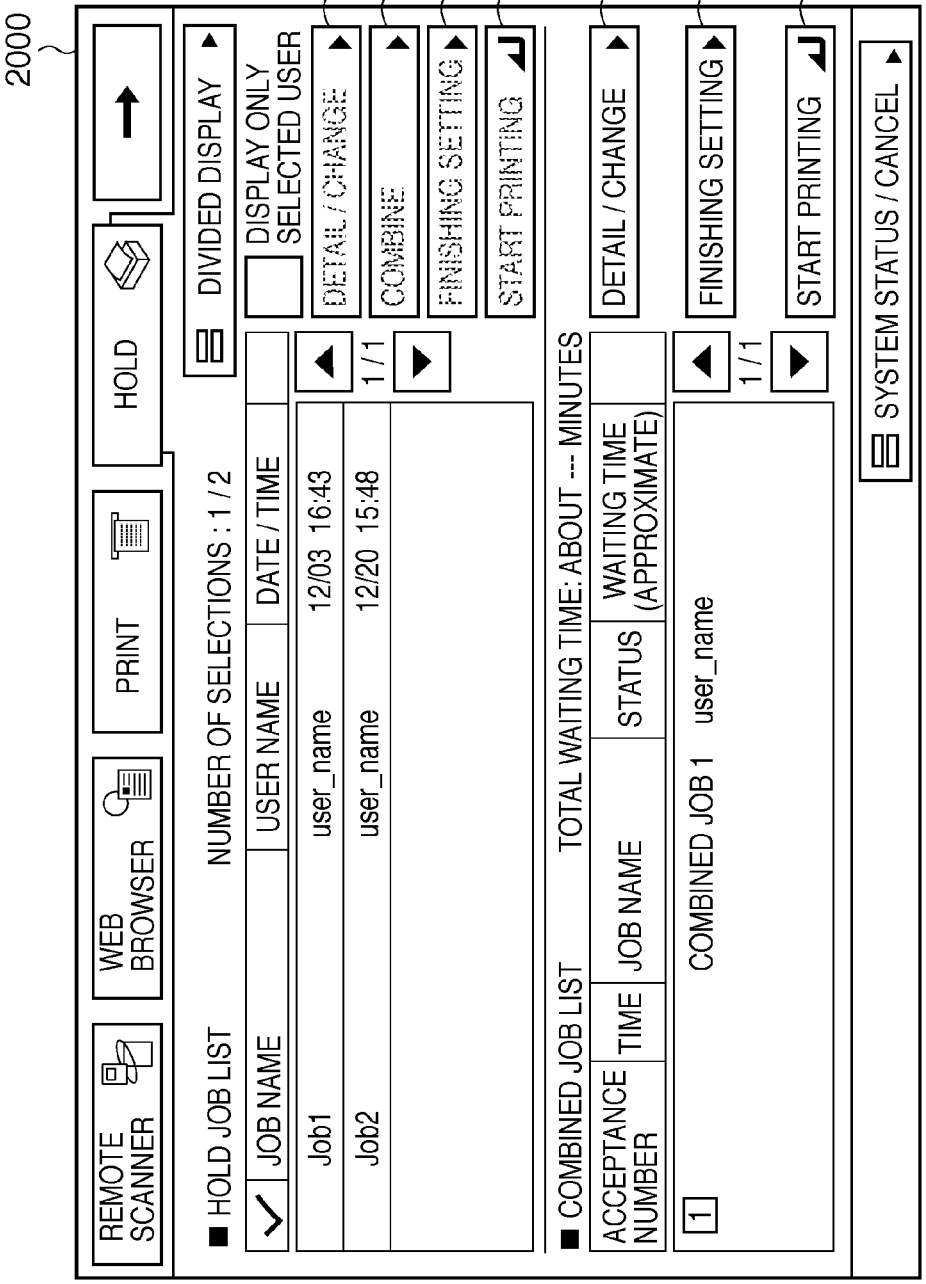
FIG. 21 is a diagram showing an example of a hold tab basic screen 2000.

For example, the hold job is effective in forming printed materials, such as weekly reports output in the past, into one batch and attaching the cover before outputting the batch as a monthly report. In this case, a user's desired printed material can be easily generated by combining the weekly report data and the cover data and treating the entire data as one job to execute the finishing setting. Thus, the pattern in the use case is that settings are first established for individual hold jobs, and after the hold jobs are combined, a setting is further added to the combined job. Details of the control flow in such a use case will be described with reference to FIG. 18A. FIG. 18A is a flow chart of a procedure when a print instruction of a hold job is accepted according to the second embodiment. The control unit 205 of the printing apparatus 100 comprehensively controls the process described below. FIGS. 19 to 21 depict examples of hold tab basic screens.

In step S301, after accepting a selection of hold tab, the control unit 205 displays a hold tab basic screen 1800 shown in FIG. 19. A list of hold jobs is displayed on the upper part and a list of combined jobs is displayed on the lower part of the hold tab basic screen 1800, and various setting buttons 1801 to 1807 are arranged on the right side of the display unit. When a job in the lists is pressed, the control unit 205 displays the job by inverting the color of the job to put the job into a selected state.

The hold tab basic screen 1800 shown in FIG. 19 illustrates a state in which Job1 is selected. In this state, since one job is selected, the control unit 205 controls to gray out the hold job combining button 1802 to make the selection impossible. If the control unit 205 determines that the selection of not only Job1 but also the selection of Job2 is accepted as shown in a hold tab basic screen 1900 shown in FIG. 20, the control unit 205 controls to activate the hold job combining button 1802 to make the selection possible.

FIG. 18A will be described further. After displaying the hold tab basic screen, the control unit 205 determines in step S302 whether various setting buttons 1801 to 1807 are accepted. If the control unit 205 determines that the hold job combining button 1802 is accepted when the hold job combining button 1802 is active as shown in FIG. 20, the control unit 205 advances the process to step S303. In step S303, the control unit 205 combines the selected hold jobs in the order of acceptance of selection. After generating a combined job, the control unit 205 further displays the generated job on a combined job list as shown in a hold tab basic screen 2000 of FIG. 21 and returns to step S302. Since the hold jobs are not selected in the hold tab basic screen 2000, the control unit 205 controls to gray out various setting buttons 1801 to 1804 for executing processes to the hold jobs to make the selection impossible.

Meanwhile, if a finishing setting button 1803 is pressed when at least one hold job or combined job is selected in the hold tab basic screen 1800 in step S302, the control unit 205 proceeds to step S305. In step S305, the control unit 205 controls to execute a finishing setting acceptance process.

Figure 18B:
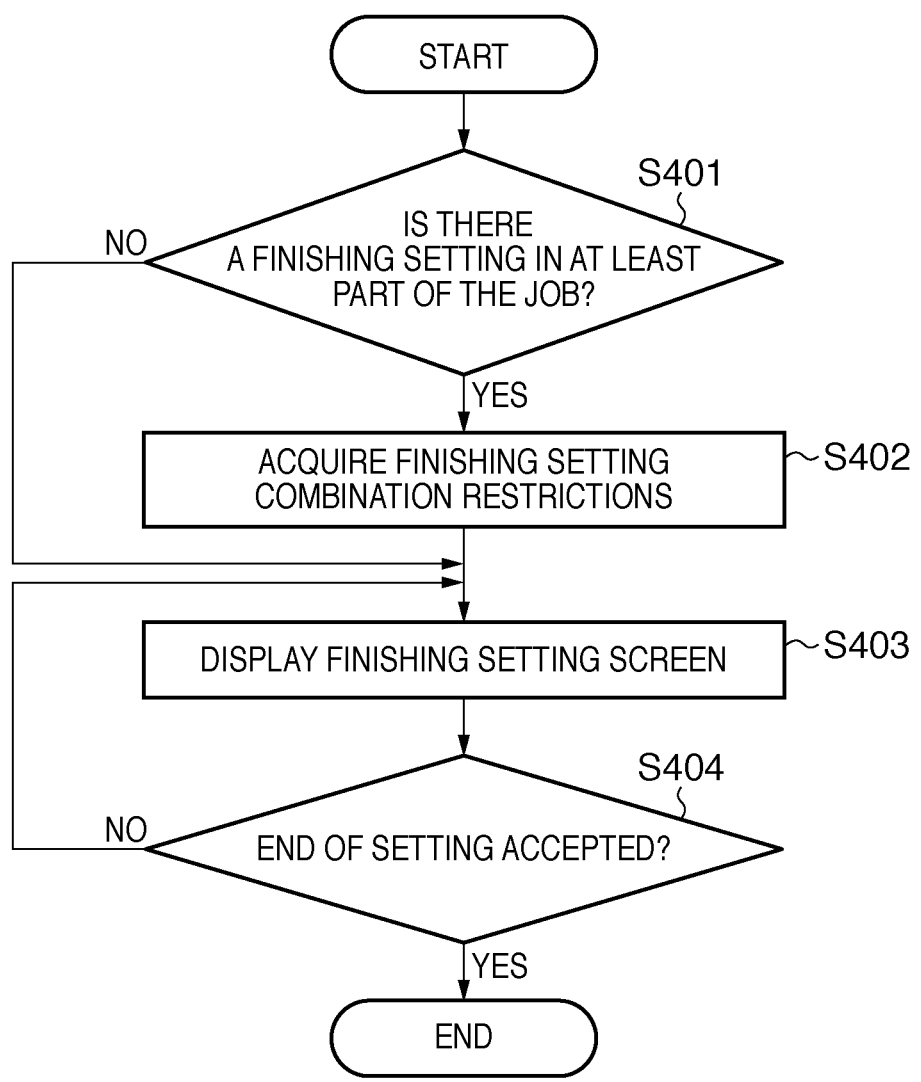
FIG. 18B is a flow chart showing a procedure of a finishing setting acceptance process according to the second embodiment.

The finishing setting acceptance process will be described with reference to FIG. 18B. FIG. 18B is a flow chart of a procedure of a finishing setting acceptance process according to the second embodiment. The control unit 205 of the printing apparatus 100 comprehensively controls the process described below.

In step S401, the control unit 205 acquires the setting of the selected print job from the HDD 209 and determines whether finishing setting is included in at least part of the job. If the finishing setting is not included, the control unit 205 proceeds to step S403 and displays a finishing setting screen without restrictions in the finishing setting as in the basic screen 1100 shown in FIG. 11.

On the other hand, if the control unit 205 determines in step S401 that finishing setting is included in at least part of the job, the control unit 205 acquires the setting of the selected print job and proceeds to step S402. In step S402, the control unit 205 acquires the combination table 1310 of finishing setting for the entire job and the combination table 1310 of finishing setting for the entire job and finishing setting for the individual jobs stored in the HDD 209. The control unit 205 further collates the acquired information and the setting of the currently selected print job acquired in step S401 and specifies setting of impossible combinations of output material. After specifying the impossible combinations, the control unit 205 proceeds to step S403 and displays the finishing setting screen according to the specified information.

In step S404, if input from the user is accepted, the control unit 205 determines whether the OK button for confirming the finishing setting confirmation is pressed as input. If the OK button is pressed, the control unit 205 holds the selected finishing setting in the RAM 208 and ends the process. On the other hand, in the case of another input, the control unit 205 returns to step S403.

FIG. 18A will be described further. If the control unit 205 determines in step S302 that a print starting request is accepted, the control unit 205 acquires the job setting held in the RAM 208 and the job setting held in the HDD 209 and executes a print process based on the setting information. Detailed description of the print process will be omitted.

In this way, combinations of the finishing setting for the entire job and the finishing setting for the individual jobs are taken into consideration and the control is changed to thereby allow proposing an efficient and economical system to the user.

The mechanism of the above two embodiments is that if one setting is made, the control of the other setting is changed. However, the arrangement is not limited to this, and a mechanism that the later setting overwrites the previous setting may be adopted. The mechanism can provide a further highly flexible system.

For example, in a hold job, if the case setting is desired for the entire combined job formed by combining a staple job and a job without finishing setting, there may be a need for canceling the staple job in the middle. Therefore, a mechanism may be adopted in which the later setting can overwrite the previous individual finishing setting.

In the above two embodiments, after scanning original batches of documents constituted by a plurality of batches of documents (subsets) loaded on the ADF, printed materials obtained by the execution of printing processes may be discharged to the same discharging unit or may be discharged to discharging units that vary in each batch of documents. A designation can be made on the scan job combination screen to discharge the printed materials to the same discharging unit, and the setting can be established on a screen for making the setting of each batch of documents to determine the destination of each batch of documents. If the printed materials are discharged to different destinations, the user can later collect the batches of documents discharged to the destinations to obtain printed materials corresponding to the original batches of documents. Such a control allows the user to flexibly set the destinations of the printed materials corresponding to the batches of documents to be scanned. Printed materials corresponding to batches of documents with the same setting may be controlled to be discharged to the same destination.

The present invention is not limited to the embodiments described above. Various modifications (including organic combinations of the embodiments) can be made based on the spirit of the present invention, and the modifications are not excluded from the scope of the present invention. For example, although the control unit 205 inside the printing apparatus 100 is the main body of the various controls described above in the present embodiments, an external controller or the like in a casing separate from the printing apparatus 100 may be configured to be able to execute part or all of the various controls.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-207405, filed Aug. 11, 2008, which is hereby incorporated by reference herein in its entirety.

What is claimed is:

1. A sheet processing system including a device for performing a case binding process, a device for performing a saddle stitching process, and a device for performing a Z-folding process, comprising:
a first setting unit configured to set the case binding process or the saddle stitching process for a plurality of sheets;
a second setting unit configured to set the Z-folding process for a part of the plurality of sheets; and
a control unit configured to permit a combination of a setting of the case binding process by the first setting unit and a setting of the Z-folding process by the second setting unit, and to inhibit a combination of the setting of the saddle stitching process by the first setting unit and the setting of the Z-folding process by the second setting unit.

2. The sheet processing system according to claim 1, wherein
the control unit inhibits the second setting unit from setting the Z-folding process when the first setting unit has set the saddle stitching process.

3. The sheet processing system according to claim 1, wherein
the control unit inhibits the first setting unit from setting the saddle stitching process when the second setting unit has set the Z-folding process.

4. A sheet processing system including a device for performing a case binding process, a device for performing a saddle stitching process, and a device for performing a Z-folding process, comprising:
a first control unit configured to control to execute the case binding process for a plurality of sheets with executing the Z-folding process for a part of the plurality of sheets; and
a second control unit configured to control not to execute the saddle stitching process for a plurality of sheets with executing the Z-folding process for a part of the plurality of sheets.

5. A control method for controlling a sheet processing system including a device for performing a case binding process, a device for performing a saddle stitching process, and a device for performing a Z-folding process, the method comprising:
setting the case binding process or the saddle stitching process for a plurality of sheets as a first setting;
setting the Z-folding process for a part of the plurality of sheets as a second setting;
permitting a combination of a setting of the case binding process as the first setting and a setting of the Z-folding process as the second setting; and
inhibiting a combination of the setting of the saddle stitching process as the first setting and the setting of the Z-folding process as the second setting.

6. A non-transitory computer-readable storage medium storing a computer program that causes a computer to perform a method for controlling a sheet processing system including a device for performing a case binding process, a device for performing a saddle stitching process, and a device for performing a Z-folding process, the method comprising:
a code to set the case binding process or the saddle stitching process for a plurality of sheets as a first setting;
a code to set the Z-folding process for a part of the plurality of sheets as a second setting;
a code to permit a combination of a setting of the case binding process as the first setting and a setting of the Z-folding process as the second setting; and
a code to inhibit a combination of the setting of the saddle stitching process as the first setting and the setting of the Z-folding process as the second setting.

* * * * *